United States Patent
Kaneda et al.

(10) Patent No.: US 8,494,233 B2
(45) Date of Patent: Jul. 23, 2013

(54) IMAGE PROCESSING APPARATUS, IMAGE PROCESSING METHOD, AND PROGRAM

(75) Inventors: Yuji Kaneda, Kawasaki (JP); Masakazu Matsugu, Yokohama (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/326,710

(22) Filed: Dec. 15, 2011

(65) Prior Publication Data

US 2012/0082384 A1 Apr. 5, 2012

Related U.S. Application Data

(63) Continuation of application No. 12/021,659, filed on Jan. 29, 2008.

(30) Foreign Application Priority Data

Jan. 30, 2007 (JP) .................................. 2007-020137

(51) Int. Cl.
*G06K 9/00* (2006.01)

(52) U.S. Cl.
USPC .......................................... 382/118; 382/190

(58) Field of Classification Search
USPC .................................. 382/118, 190
See application file for complete search history.

(56) References Cited

U.S. PATENT DOCUMENTS

| | | | |
|---|---|---|---|
| 5,850,470 A | 12/1998 | Kung et al. | |
| 6,128,398 A | 10/2000 | Kuperstein et al. | |
| 6,466,685 B1 | 10/2002 | Fukui et al. | |
| 6,507,358 B1 | 1/2003 | Mori et al. | |
| 6,952,498 B2 | 10/2005 | Ishikura | |
| 7,266,224 B2 | 9/2007 | Sukegawa | |
| 7,319,778 B2 | 1/2008 | Ono | |
| 7,426,287 B2 | 9/2008 | Yoon et al. | |
| 7,835,541 B2 | 11/2010 | Lee et al. | |
| 2001/0031073 A1 | 10/2001 | Tajima | |
| 2002/0041700 A1 | 4/2002 | Therbaud | |
| 2003/0161504 A1 | 8/2003 | Inoue | |
| 2003/0198368 A1 | 10/2003 | Kee | |
| 2004/0213453 A1 | 10/2004 | Liu et al. | |
| 2005/0041867 A1 | 2/2005 | Loy et al. | |
| 2005/0117779 A1 | 6/2005 | Horie et al. | |

(Continued)

FOREIGN PATENT DOCUMENTS

JP   2840816 B2   12/1998
JP   2000-030065 A   1/2000

(Continued)

OTHER PUBLICATIONS

Bourel et al., Recognition of Facial Expressions in the Presence of Occlusion, pp. 213-222.*

(Continued)

*Primary Examiner* — John Strege
(74) *Attorney, Agent, or Firm* — Fitzpatrick, Cella, Harper & Scinto

(57) ABSTRACT

A feature point detection unit (153) and feature amount extraction unit (154) extract a plurality of features of an object from input image data. When there are unextracted features of the plurality of features, a weight setting unit (155) sets weights for the extracted features. A facial expression determination unit (156) executes recognition processing of the object based on the features weighted by the weight setting unit (155).

9 Claims, 36 Drawing Sheets

U.S. PATENT DOCUMENTS

| | | |
|---|---|---|
| 2005/0135679 A1 | 6/2005 | Yoon et al. |
| 2006/0115157 A1 | 6/2006 | Mori et al. |
| 2006/0126939 A1 | 6/2006 | Park et al. |
| 2006/0215905 A1 | 9/2006 | Kitamura et al. |
| 2006/0222214 A1 | 10/2006 | Kaneda et al. |
| 2007/0025722 A1 | 2/2007 | Matsugu et al. |
| 2007/0292019 A1 | 12/2007 | Terakawa |
| 2008/0181508 A1 | 7/2008 | Kaneda et al. |
| 2009/0169101 A1 | 7/2009 | Mitarai et al. |

FOREIGN PATENT DOCUMENTS

| | | |
|---|---|---|
| JP | 2002-352229 A | 12/2002 |
| JP | 2003-323622 A | 11/2003 |
| JP | 2005-056388 A | 3/2005 |
| JP | 2005-084815 A | 3/2005 |
| WO | 01/22355 A1 | 3/2001 |

OTHER PUBLICATIONS

May 8, 2008 European Search Report in European Patent Appln. No. 08001353.5.

XP-002276538, A.M. Martinez, "Recognizing Imprecisely Localized, Partially Occluded, and Expression Variant Faces from a Single Sample per Class," IEEE Transactions on Pattern Analysis and Machine Intelligence, vol. 24, No. 6, Jun. 2002, pp. 748-763.

Edgar Osuna, et al., "Training Support Vector Machines: an Application to Face Detection," Proceedings of IEEE '97, 1997, pp. 130-136.

Yann Le Cun, et al., "Convolutional Networks for Images, Speech, and Time Series" The Handbook of Brain Theory and Neural Networks, 1995, pp. 255-258.

Satosi Watanabe, et al., "Subspace Method of Pattern Recognition," Proceedings of 1st International Joint Conference of Pattern Recognition, Oct. 30-Nov. 1, 1973, pp. 25-32.

* cited by examiner

F I G. 4
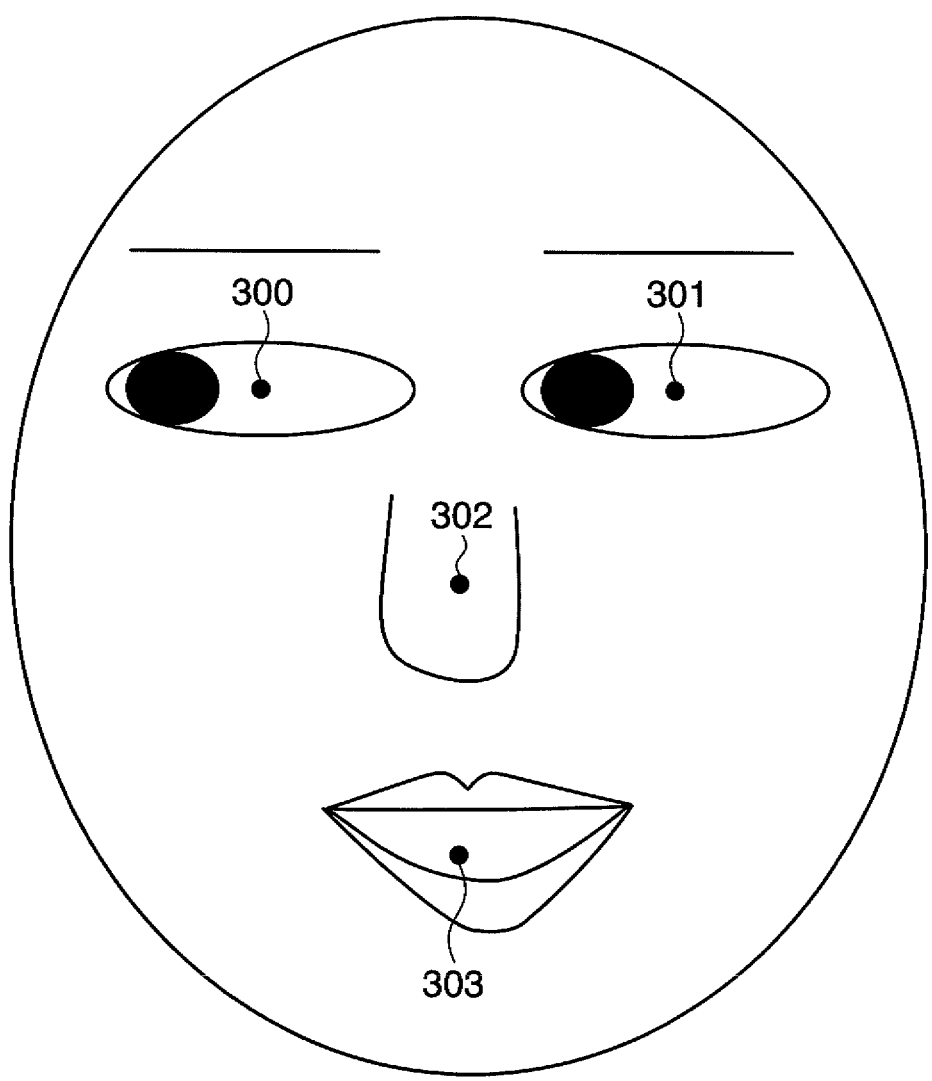

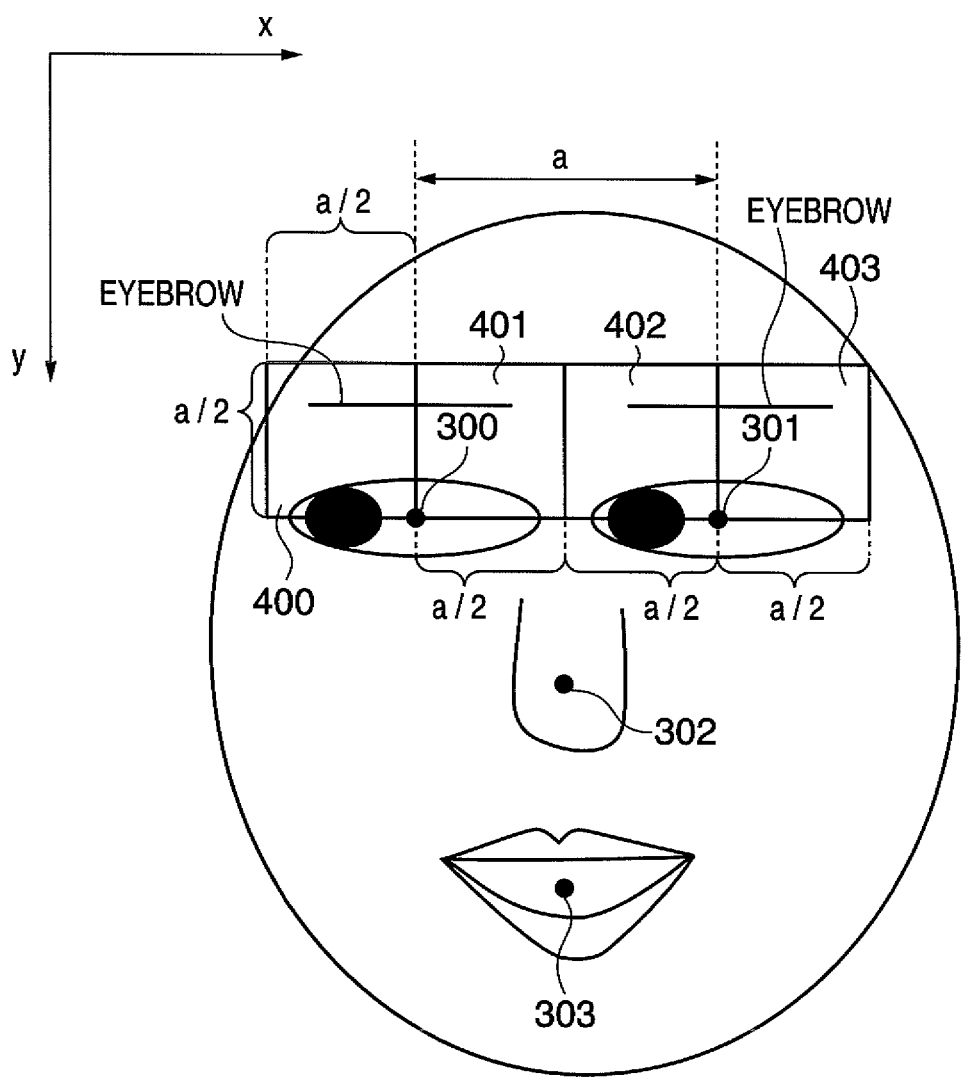
F I G. 7

F I G. 10
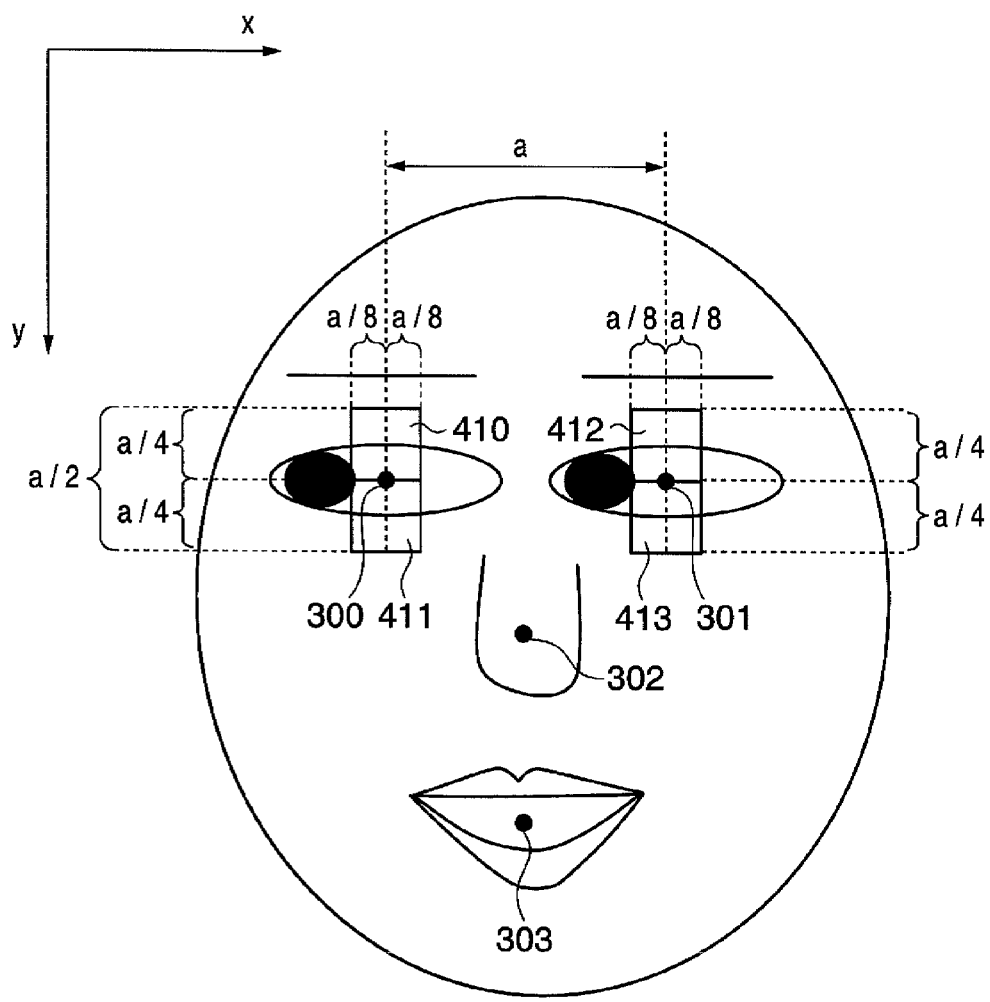

F I G. 13
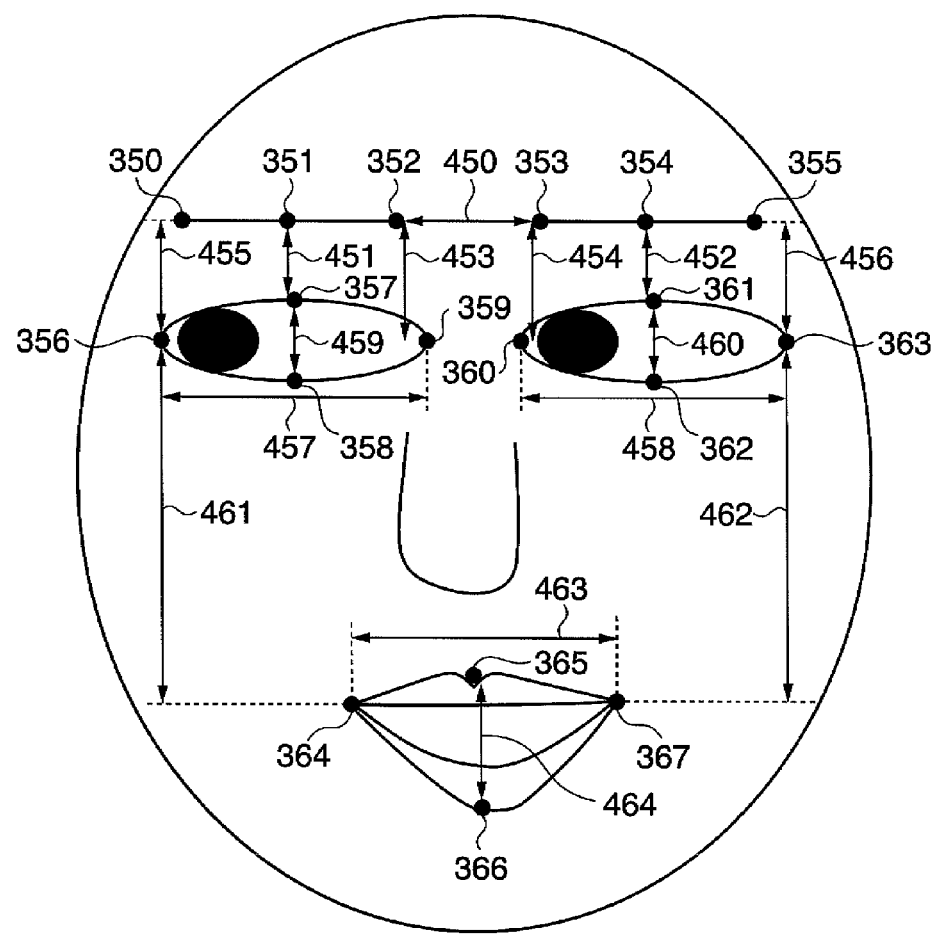

FIG. 16A

WEIGHTING LUT OF FACIAL EXPRESSION NUMBER 1

| UNEXTRACTED FEATURE AMOUNT \ WEIGHT | WEIGHT OF FEATURE AMOUNT A | WEIGHT OF FEATURE AMOUNT B | WEIGHT OF FEATURE AMOUNT C | ...... |
|---|---|---|---|---|
| FEATURE AMOUNT A | — | b11 | c11 | d11 |
| FEATURE AMOUNT B | a12 | — | c12 | d12 |
| FEATURE AMOUNT A AND FEATURE AMOUNT B | — | — | c13 | d14 |
| ... | ... | ... | ... | ... |

FIG. 16B

WEIGHTING LUT OF FACIAL EXPRESSION NUMBER 2

| UNEXTRACTED FEATURE AMOUNT \ WEIGHT | WEIGHT OF FEATURE AMOUNT A | WEIGHT OF FEATURE AMOUNT B | WEIGHT OF FEATURE AMOUNT C | ...... |
|---|---|---|---|---|
| FEATURE AMOUNT A | — | b21 | c21 | d21 |
| FEATURE AMOUNT B | a22 | — | c22 | d22 |
| FEATURE AMOUNT A AND FEATURE AMOUNT B | — | — | c23 | d24 |
| ... | ... | ... | ... | ... |

FIG. 22

< FACIAL EXPRESSION LIMITATION LUT >

| UNSET REGION | FACIAL EXPRESSION TO BE DETERMINED |
|---|---|
| REGION A | FACIAL EXPRESSION NUMBER 1, FACIAL EXPRESSION NUMBER 2, ... |
| REGION B | FACIAL EXPRESSION NUMBER 2, FACIAL EXPRESSION NUMBER 4, ... |
| REGION A AND REGION B | FACIAL EXPRESSION NUMBER 1, FACIAL EXPRESSION NUMBER 4... |
| ⋮ | ⋮ |

F I G. 31
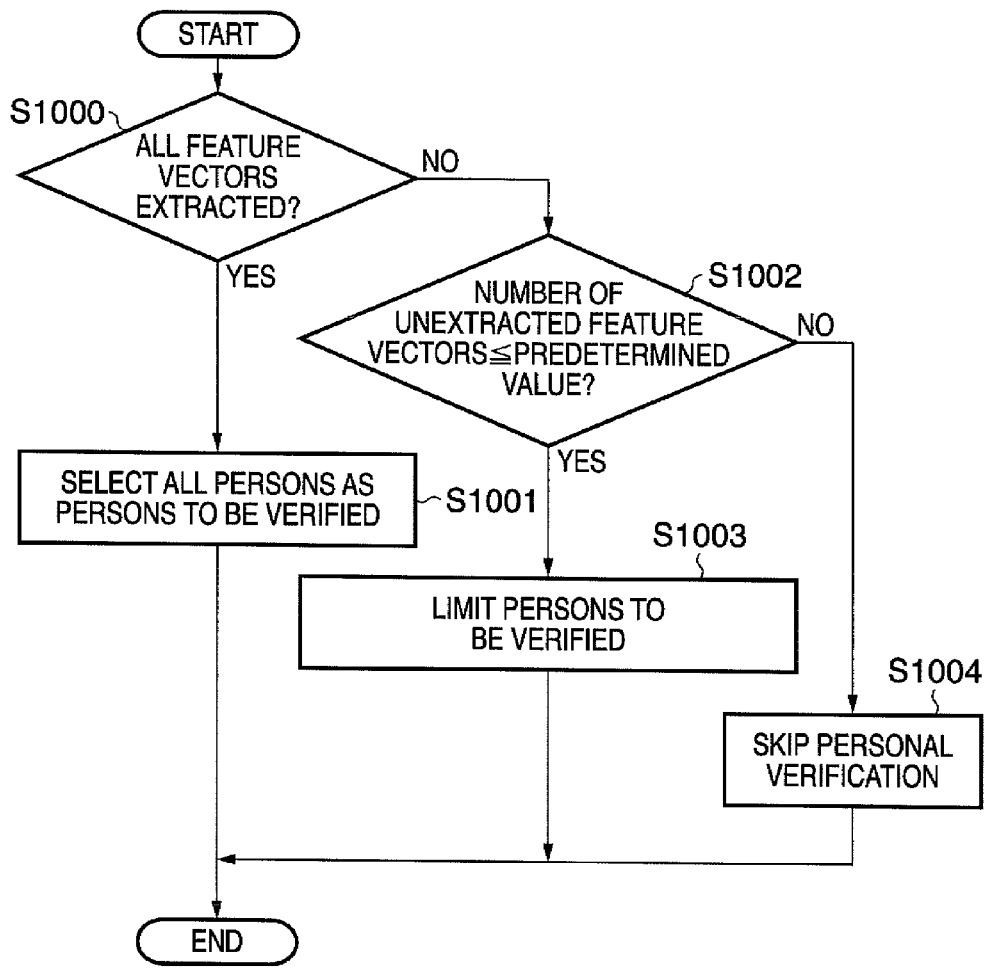

F I G. 33

< PERSONAL VERIFICATION DATABASE >

| REGISTERED PERSON | KEYWORD |
|---|---|
| A | MUSTACHE |
| B | EYEGLASSES |
| ⋮ | ⋮ |

IMAGE PROCESSING APPARATUS, IMAGE PROCESSING METHOD, AND PROGRAM

This application is a continuation of application Ser. No. 12/021,659 filed Jan. 29, 2008.

BACKGROUND OF THE INVENTION

1. Field of the Invention

The present invention relates to an image processing apparatus and image processing method, which execute recognition processing of an object in image data, and to a program stored in a computer-readable storage medium for making a computer execute the image processing method.

2. Description of the Related Art

A technique which detects the presence/absence of a face of a person from an image, and recognizes a facial expression of that person by detecting the features of the face of the person is known.

For example, a method which extracts a part corresponding to a predetermined region where a facial expression of a person is readily shown from an image, computes the wavelet transforms of the extracted part to calculate an average power for respective frequency bands, and detects the facial expression based on a difference from an average power obtained from an expressionless face is known (for example, see patent reference 1). Also, a method which detects variations of predetermined features required to recognize a facial expression based on differences between feature amounts of an expressionless face prepared in advance and a face to be recognized, and calculates scores for respective facial expressions from the variations of the predetermined features so as to recognize a facial expression is known (for example, see patent reference 2).

However, with the aforementioned techniques, features used in recognition processing cannot often be accurately detected due to influences of some kind of shadows, accessories, and the like.

Hence, as techniques that can implement recognition processing even when these influences occur, the following techniques have been proposed.

A technique of patent reference 3 below discloses the following method. That is, the entire input facial image is divided into blocks, distances between feature vectors obtained from these blocks and average feature vectors of corresponding blocks obtained from a registered image group prepared in advance are calculated, and the feature vectors are weighted for respective blocks. After that, verification scores are calculated based on the weighted feature vectors, thus executing verification processing. Furthermore, a technique of patent reference 4 below discloses a method which detects a face part with high precision by processing an image from which reflected images of objects having shining reflecting surfaces such as spectacles are removed in a face part detection technique.

[Patent Reference 1] Japanese Patent No. 2840816
[Patent Reference 2] Japanese Patent Laid-Open No. 2005-56388
[Patent Reference 3] Japanese Patent Laid-Open No. 2003-323622
[Patent Reference 4] Japanese Patent Laid-Open No. 2002-352229
[Patent Reference 5] Japanese Patent Laid-Open No. 2000-30065

[Non-parent Reference 1] Edgar Osuna, Robert Freund, Federico Girosi "Training Support Vector Machines: an Application to Face Detection" Proceedings of CVPR '97, pp. 130-136, 1997
[Non-patent Reference 2] Yann LeCun and Yoshua Bengio "Convolutional Networks for Images, Speech, and Time Series" The Handbook of Brain Theory and Neural Networks, pp. 255-258, 1995
[Non-patent Reference 3] Watanabe, S. and Pakvasa, N. (1973). Subspace method of pattern recognition, Proceedings of 1st International Joint Conference of Pattern Recognition, pp. 25-32

A facial expression of a person can be expressed by a combination of motions of parts such as eyebrows, eyes, a mouth, cheeks, and the like. Upon recognizing a facial expression, only regions where expressive motions readily appear are set and analysis is made in these set regions in place of merely dividing a facial region into some regions and executing analysis in all the regions, thus leading to a reduction of processing cost.

Respective regions have different importance levels depending on facial expressions (for example, in a smile, a region around a mouth is apt to relatively largely change, but regions around eyes do not change so largely). Hence, it is desirable to weight respective parts such as eyes, a mouth, and the like, which form a face and where expressive motions readily appear or respective regions upon dividing a facial region into a plurality of regions in accordance with a facial expression to be recognized.

Upon verifying a person, a face is divided into a plurality of regions, only regions important for personal verification are set, and only the set regions need only undergo analysis. In this case, features obtained from these set regions have different importance levels. For example, features extracted from regions such as cheek regions including no parts often have lower importance levels than those extracted from regions near eyes and a mouth as features required to verify a person.

As a method of setting regions required to recognize a facial expression as described above, for example, a method of extracting the positions of eyes and a mouth by some method, and setting regions using these positions is available.

However, when the positions of eyes and a mouth cannot be detected due to occlusions by something such as sunglasses, mustache, shadows, and the like, regions where expressive motions readily appear cannot be set, either. In this case, all predetermined features cannot be detected, and a facial expression cannot be recognized. Even when some image correction is applied, the influences of sunglasses, mustache, shadows, and the like cannot be perfectly removed.

On the other hand, in case of personal verification as well, predetermined regions required to make personal verification cannot be set due to the influences of sunglasses, mustache, shadows, and the like, and predetermined features cannot be extracted. Hence, a person cannot often be verified in such case.

SUMMARY OF THE INVENTION

The present invention has been made in consideration of the aforementioned problems, and has as its object to execute recognition processing with high precision even when unextracted features remain upon execution of the recognition processing such as facial expression recognition of a person, personal verification, or the like.

According to the first aspect of the present invention, an image processing apparatus comprises a feature extraction unit adapted to extract a plurality of predetermined features in an object from input image data;

a weight setting unit adapted to set weights for the features extracted by the feature extraction unit when there are features which are not extracted by the feature extraction unit; and a recognition processing unit adapted to execute recognition processing of the object based on the features weighted by the weight setting unit.

According to the second aspect of the present invention, an image processing apparatus comprises a feature extraction unit adapted to extract a plurality of predetermined features in an object from input image data;

a limitation unit adapted to limit, when there are features which are not extracted by the feature extraction unit, a range of recognition processing based on the unextracted features; and a recognition processing unit adapted to execute recognition processing of the object based on the range limited by the limitation unit.

According to the third aspect of the present invention, an image processing apparatus comprises a feature extraction unit adapted to extract a plurality of predetermined features in an object from input image data;

a supplementation unit adapted to supplement, when there are features which are not extracted by the feature extraction unit, of the plurality of features, the unextracted features based on information of the features extracted by the feature extraction unit; and a recognition processing unit adapted to execute recognition processing of the object based on the unextracted features supplemented by the supplementation unit and the features extracted by the feature extraction unit.

According to the fourth aspect of the present invention, an image processing method comprises a feature extraction step of extracting a plurality of predetermined features in an object from input image data;

a weight setting step of setting weights for the features extracted in the feature extraction step when there are features which are not extracted in the feature extraction step; and a recognition processing step of executing recognition processing of the object based on the features weighted in the weight setting step.

According to the fifth aspect of the present invention, an image processing method comprises a feature extraction step of extracting a plurality of predetermined features in an object from input image data;

a limitation step of limiting, when there are features which are not extracted in the feature extraction step, a range of recognition processing based on the unextracted features; and a recognition processing step of executing recognition processing of the object based on the range limited in the limitation step.

According to the sixth aspect of the present invention, an image processing method comprises a feature extraction step of extracting a plurality of predetermined features in an object from input image data;

a supplementation step of supplementing, when there are features which are not extracted in the feature extraction step, of the plurality of features, the unextracted features based on information of the features extracted in the feature extraction step; and a recognition processing step of executing recognition processing of the object based on the unextracted features supplemented in the supplementation step and the features extracted in the feature extraction step.

According to the seventh aspect of the present invention, a program stored in a computer-readable storage medium for making a computer execute a feature extraction step of extracting a plurality of predetermined features in an object from input image data;

a weight setting step of setting weights for the features extracted in the feature extraction step when there are features which are not extracted in the feature extraction step; and a recognition processing step of executing recognition processing of the object based on the features weighted in the weight setting step.

According to the eighth aspect of the present invention, a program stored in a computer-readable storage medium for making a computer execute a feature extraction step of extracting a plurality of predetermined features in an object from input image data;

a limitation step of limiting, when there are features which are not extracted in the feature extraction step, a range of recognition processing based on the unextracted features; and a recognition processing step of executing recognition processing of the object based on the range limited in the limitation step.

According to the ninth aspect of the present invention, a program stored in a computer-readable storage medium for making a computer execute a feature extraction step of extracting a plurality of predetermined features in an object from input image data;

a supplementation step of supplementing, when there are features which are not extracted in the feature extraction step, of the plurality of features, the unextracted features based on information of the features extracted in the feature extraction step; and a recognition processing step of executing recognition processing of the object based on the unextracted features supplemented in the supplementation step and the features extracted in the feature extraction step.

Further features of the present invention will become apparent from the following description of exemplary embodiments with reference to the attached drawings.

BRIEF DESCRIPTION OF THE DRAWINGS

FIG. 4 is a view showing the eye, mouth, and face positions obtained as a result of face detection processing of an eye/mouth/face detection unit;

FIG. 7 is a view showing detection region setting processing of feature points associated with eyebrows shown in FIG. 6 executed by a feature point detection region setting unit;

FIG. 10 is a view showing detection region setting processing of feature points associated with eyes shown in FIG. 6 executed by the feature point detection region setting unit;

FIG. 13 is a view showing feature amounts extracted by a feature amount extraction unit;

FIGS. 16A and 16B are views showing an example of weighting LUTs (Look Up Tables) for the extracted feature amounts in correspondence with respective facial expression numbers;

FIG. 22 is a view showing an example of an LUT used upon execution of facial expression limitation processing by a facial expression limitation unit;

FIG. 31 is a flowchart showing limitation processing of persons to be verified by a person to be verified limitation unit;

FIG. 33 is a view showing registered persons who are registered in a database and keywords corresponding to these persons;

DESCRIPTION OF THE EMBODIMENTS

Preferred embodiments of the present invention will be described in detail hereinafter with reference to the accompanying drawings. Note that the following description will be given taking an application example of an image sensing device as an image processing apparatus according to the present invention.

(First Embodiment)

The first embodiment of the present invention will be described in detail hereinafter with reference to the accompanying drawings.

Figure 1:
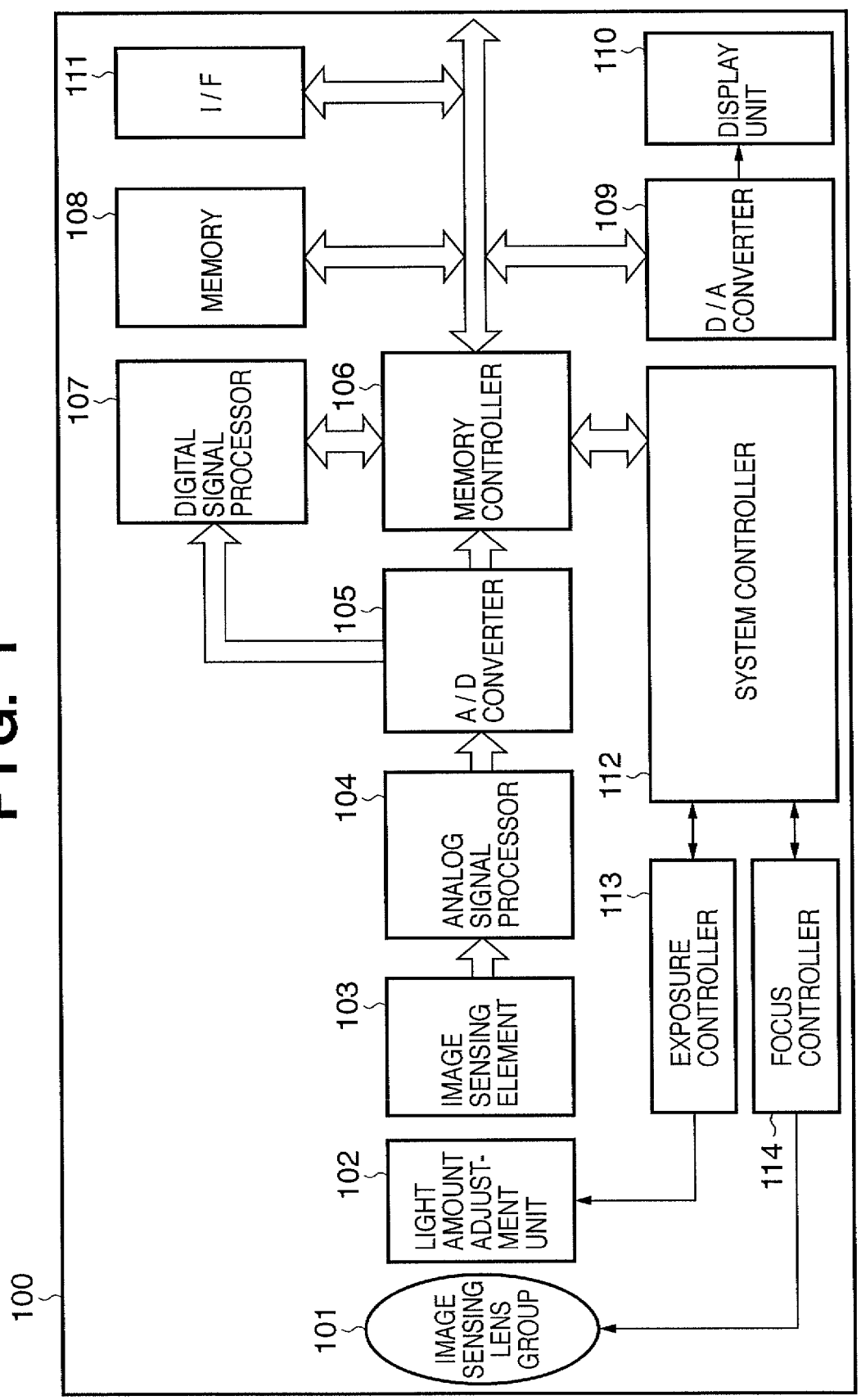
FIG. 1 is a schematic block diagram showing the arrangement of an image sensing device (image processing apparatus) according to the first embodiment.

FIG. 1 is a schematic block diagram showing the arrangement of an image sensing device (image processing apparatus) 100 according to the first embodiment. In this embodiment, a digital still camera is used as an example of the image sensing device 100.

Referring to FIG. 1, an image sensing lens group 101 guides an optical image of an object into the image sensing device 100. A light amount adjustment unit 102 comprises an aperture mechanism and shutter mechanism, and adjusts the light amount of the optical image of the object which enters via the image sensing lens group 101. An image sensing element 103 converts the optical image (light beam) of the object that has passed through the image sensing lens group 101 into an electrical signal, and comprises, e.g., a CCD, CMOS sensor, or the like.

An analog signal processor 104 applies clamp processing, gain processing, and the like to an analog signal as the electrical signal output from the image sensing element 103. An analog-to-digital (to be abbreviated as "A/D" hereinafter) converter 105 converts the analog signal output from the analog signal processor 104 into a digital signal, and outputs that digital signal as image data.

A digital signal processor 107 applies predetermined pixel interpolation processing, color conversion processing, and the like to the image data from the A/D converter 105 or that from a memory controller 106. The digital signal processor 107 executes predetermined arithmetic processing using these image data, and also executes TTL (through-the-lens) AWB (auto white balance) processing based on the obtained arithmetic result. Furthermore, the digital signal processor 107 detects a specific object from the image data and executes facial expression recognition processing of the specific object under the control of a system controller 112 (to be described later).

The system controller 112 (to be described later) also executes TTL AF (auto focus) processing, AE (auto exposure)

processing, and EF (electronic flash pre-emission) processing that execute control for an exposure controller 113 and focus controller 114 based on the arithmetic result of the digital signal processor 107.

The memory controller 106 controls the analog signal processor 104, the A/D converter 105, the digital signal processor 107, a memory 108, a digital-to-analog (to be abbreviated as "D/A" hereinafter) converter 109, and an interface (I/F) 111. With this control, image data A/D-converted by the A/D converter 105 is written (stored) in the memory 108 via the digital signal processor 107 and memory controller 106 or via the memory controller 106 directly.

The memory 108 comprises, e.g., a RAM, and stores various data such as image data to be displayed on a display unit 110 and the like. The image data and the like stored in this memory 108 are displayed on the display unit 110, which comprises a TFT, LCD, or the like, via the D/A converter 109. The memory 108 can store image data associated with sensed still images and those associated with a moving image, and has a storage capacity large enough to store image data associated with the predetermined number of still images and those associated with a moving image for a predetermined period of time.

Hence, even in case of continuous image sensing and panoramic image sensing for continuously sensing a plurality of still images, image data can be written in large quantities in the memory 108 at high speed. Also, the memory 108 can be used as a work area of the system controller 112. Note that image data associated with the sensed still images and moving image may be written in storage media such as a CD-ROM, flexible disk, hard disk, magnetic tape, magneto-optical disk, nonvolatile memory card, and the like via the interface (I/F) 111.

The display unit 110 displays image data sensed by the image sensing element 103. In this case, when the image data are sequentially displayed on the display unit 110, the display unit 110 can serve as a so-called electronic viewfinder. Also, the display unit 110 can arbitrarily turn on/off its display under the control of the system controller 112. When the display of the display unit 110 is turned off, the consumption power of the image sensing device 100 can be greatly reduced compared to the case in which the display is ON. The display unit 110 displays the operation states, messages, and the like using text, images, and the like in accordance with execution of programs by the system controller 112.

The interface (I/F) 111 controls connections between, e.g., the image sensing device 100 and a storage medium such as a memory card, hard disk, or the like. This interface (I/F) 111 can be used to exchange image data and management information appended to the image data with another computer, peripheral devices such as printers, and the like. When this interface (I/F) 111 is configured to comply with the standards of a PCMCIA card, CF (CompactFlash®) card, and the like, various communication cards can be connected. As various communication cards, communication cards such as a LAN card, modem card, USB card, IEEE1394 card, P1284 card, SCSI card, PHS, and the like are available.

The system controller 112 systematically controls the overall operation of the image sensing device 100. The system controller 112 stores, in its internal memory, its own operation programs, and constants, variables, programs, and the like required to recognize the face and facial expression of a specific object. Note that these constants, variables, programs, and the like stored in the internal memory of the system controller 112 can be changed using a storage medium such as a CD-ROM, flexible disk, hard disk, magnetic tape, magneto-optical disk, nonvolatile memory card, or the like.

The operation programs of the system controller 112, and the data and programs required to recognize the face and facial expression of a specific object may be loaded from the storage medium upon execution without being stored in the internal memory of the system controller 112.

The exposure controller 113 controls the aperture mechanism and shutter mechanism of the light amount adjustment unit 102. The focus controller 114 controls focusing and zooming of the image sensing lens group 101. The exposure controller 113 and focus controller 114 are controlled using, e.g., the TTL system, and the system controller 112 controls the exposure controller 113 and focus controller 114 based on the arithmetic result of image data by the digital signal processor 107.

The control operation of the image sensing device 100 according to this embodiment will be described below.

Figure 2:
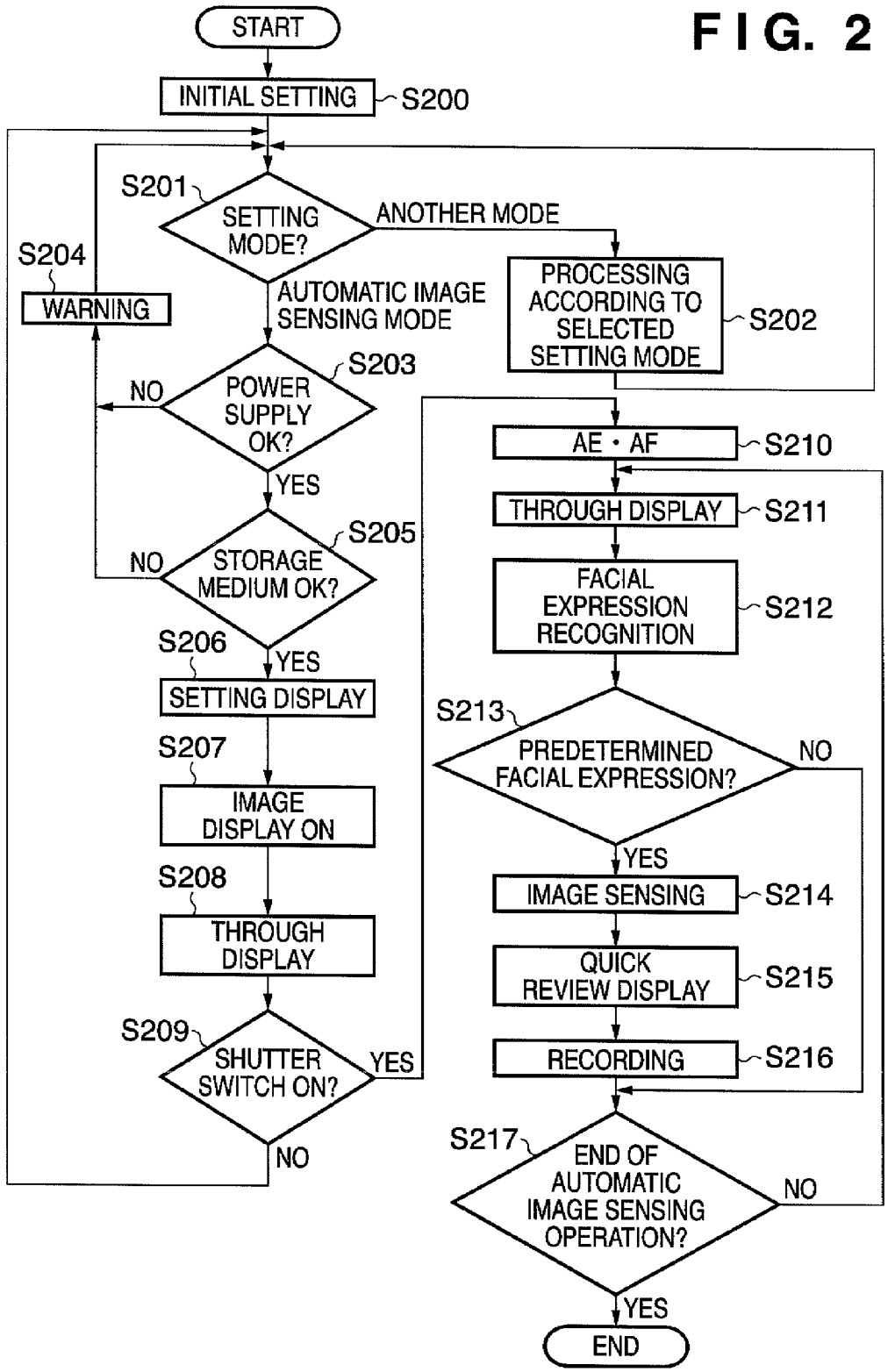
FIG. 2 is a flowchart showing the control operation of the image sensing device (image processing apparatus) according to the first embodiment.

FIG. 2 is a flowchart showing the control operation of the image sensing device (image processing apparatus) 100 according to the first embodiment. Note that a program required to implement the processing shown in FIG. 2 is stored in the internal memory in the system controller 112, and is executed under the control of the system controller 112. The processing shown in FIG. 2 is started upon, e.g., power ON of the image sensing device 100.

In step S200, the system controller 112 makes initial settings by initializing various flags, control variables, and the like stored in its internal memory.

In step S201, the system controller 112 detects the mode setting state of the image sensing device 100 to check the detected set mode. As a result of checking, if the set mode is an automatic image sensing mode, the process advances to step S203. On the other hand, as a result of checking in step S201, if the set mode is other than the automatic image sensing mode, the system controller 112 executes processing according to the selected set mode in step S202, and the process returns to step S201 after completion of the processing.

The system controller 112 checks in step S203 whether or not the remaining capacity and operation state of a power supply of the image sensing device 100 pose any problem. As a result of checking, if the power supply poses any problem, the system controller 112 generates a predetermined visual or audible warning using the display unit 110 in step S204, and the process then returns to step S201.

On the other hand, as a result of checking in step S203, if the power supply does not pose any problem, the system controller 112 checks in step S205 whether or not the storage medium poses any problem in the operation of the image sensing device 100 (especially in the recording and reproduction operations of image data with respect to the storage medium). As a result of checking, if the storage medium poses any problem, the system controller 112 generates a predetermined visual or audible warning using the display unit 110 in step S204, and the process then returns to step S201.

On the other hand, as a result of checking in step S205, if the storage medium does not pose any problem, the process advances to step S206. In step S206, the system controller 112 displays a user interface (to be abbreviated as "UI" hereinafter) which allows the user to make various settings of the image sensing device 100 by means of images, audios, and the like using the display unit 110. In this way, the user makes various settings.

In step S207, the system controller 112 sets the sensed image display on the display unit 110 in an ON state.

In step S208, the system controller 112 sets a through display state for sequentially displaying a sensed image based on sensed image data. In this through display state, since image data sequentially written in the memory 108 is sequentially displayed on the display unit 110, an electronic viewfinder function is implemented.

The system controller 112 then checks in step S209 if the user such as a photographer or the like presses a shutter switch (not shown) of the image sensing device 100 to turn it on. As a result of checking that the user does not turn on the shutter switch, the process returns to step S201.

On the other hand, as a result of checking in step S209, if the user turns on the shutter switch, the system controller 112 makes the exposure controller 113 and focus controller 114 execute predetermined AE control and AF control, and then performs an image sensing operation in step S210. Note that the AE control and AF control may be executed at a predetermined time interval after the shutter switch is ON or may be executed again according to the result of face detection processing executed in the facial expression recognition processing in step S212 (to be described later).

In step S211, the system controller 112 through-displays image data obtained as a result of the image sensing operation in step S211 on the display unit 110.

In step S212, the system controller 112 controls the digital signal processor 107 to execute the facial expression recognition processing using the sensed image data.

The method of the facial expression recognition processing of a person (object) in step S212 will be described below.

Figure 3:
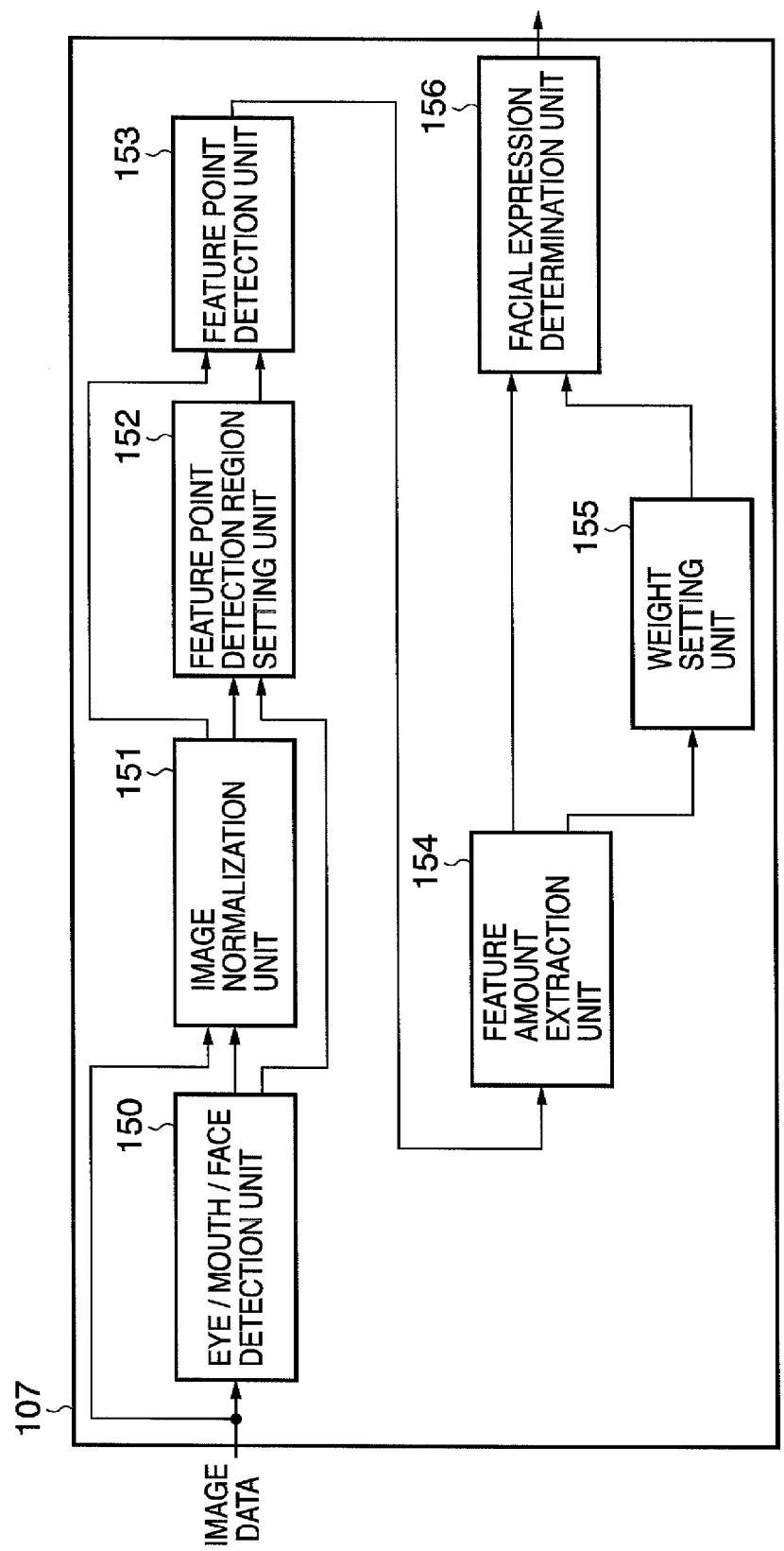
FIG. 3 is a block diagram showing the functional arrangement associated with facial expression recognition processing executed by a digital signal processor according to the first embodiment.

FIG. 3 is a block diagram showing the functional arrangement associated with the facial expression recognition processing executed by the digital signal processor 107.

An eye/mouth/face detection unit 150 shown in FIG. 3 applies predetermined processing to image data (digital signal) output from the A/D converter 105 to detect the face position, eye positions, and mouth position of a specific object in the image based on the image data.

An image normalization unit 151 executes normalization processing of a face image size and rotation direction (orientation) in face image data in the image data based on the information of the eye positions, mouth position, and face position detected by the eye/mouth/face detection unit 150.

A feature point detection region setting unit 152 sets regions from which predetermined feature points are to be detected using the face image data normalized by the image normalization unit 151 and the information of the face, eye, and mouth positions detected by the eye/mouth/face detection unit 150.

A feature point detection unit 153 detects predetermined feature points from the face image data normalized by the image normalization unit 151 and the respective setting regions set by the feature point detection region setting unit 152. A feature amount extraction unit 154 extracts predetermined feature amounts used in facial expression recognition based on the predetermined feature points detected by the feature point detection unit 153. Note that the feature point detection unit 153 and feature amount extraction unit 154 form a feature extraction unit which extracts a plurality of features in an object from the input image data.

A weight setting unit 155 changes weights for the predetermined feature amounts based on the feature amount extraction result of the feature amount extraction unit 154 when some feature amounts cannot be extracted.

A facial expression determination unit 156 determines a facial expression using the predetermined feature amounts extracted by the feature amount extraction unit 154 and the weights set by the weight setting unit 155. Note that the facial expression determination unit 156 forms a recognition processing unit that performs recognition processing of an object in the input image data.

The units shown in FIG. 3 will be described in detail below.

The eye/mouth/face detection unit 150 applies face detection processing to image data (digital signal) output from the A/D converter 105.

FIG. 4 is a view showing the eye, mouth, and face positions of a person obtained as a result of the face detection processing by the eye/mouth/face detection unit 150. Note that the detection processing of the face position by the eye/mouth/face detection unit 150 is implemented by the following method. For example, a large number of face image data and non-face image data are prepared in advance and are learned by a Support Vector Machine, as described in non-patent reference 1 above, and a face region and non-face region are separately detected. As a result, a face position 302 shown in FIG. 4 is detected.

The detection processing of the eye and mouth positions is implemented by the same method as the detection processing of the face position. That is, a large number of eye and mouth image data, and non-eye and non-mouth image data are prepared in advance, and are learned by the Support Vector Machine so as to search a surrounding part of the detected face position 302 shown in FIG. 4. As a result, eye positions 300 and 301 and a mouth position 303 shown in FIG. 4 are detected. As another method, the eye positions 300 and 301 and the mouth position 303 shown in FIG. 4 may be detected using templates used to detect the eye and mouth positions around the detected face position 302. Note that the detection method of the eye positions 300 and 301, mouth position 303, and face position 302 is not limited to these methods, and these positions may be detected using other methods. As described in non-patent reference 2, a Convolutional Neural Network may be applied to face detection.

The image normalization unit 151 executes normalization processing of the size and rotation direction (orientation) of the face image data used by the eye/mouth/face detection unit 150 using the three points of position information of the face position 302 and the eye positions 300 and 301 shown in FIG. 4 detected by the eye/mouth/face detection unit 150.

Figure 5:
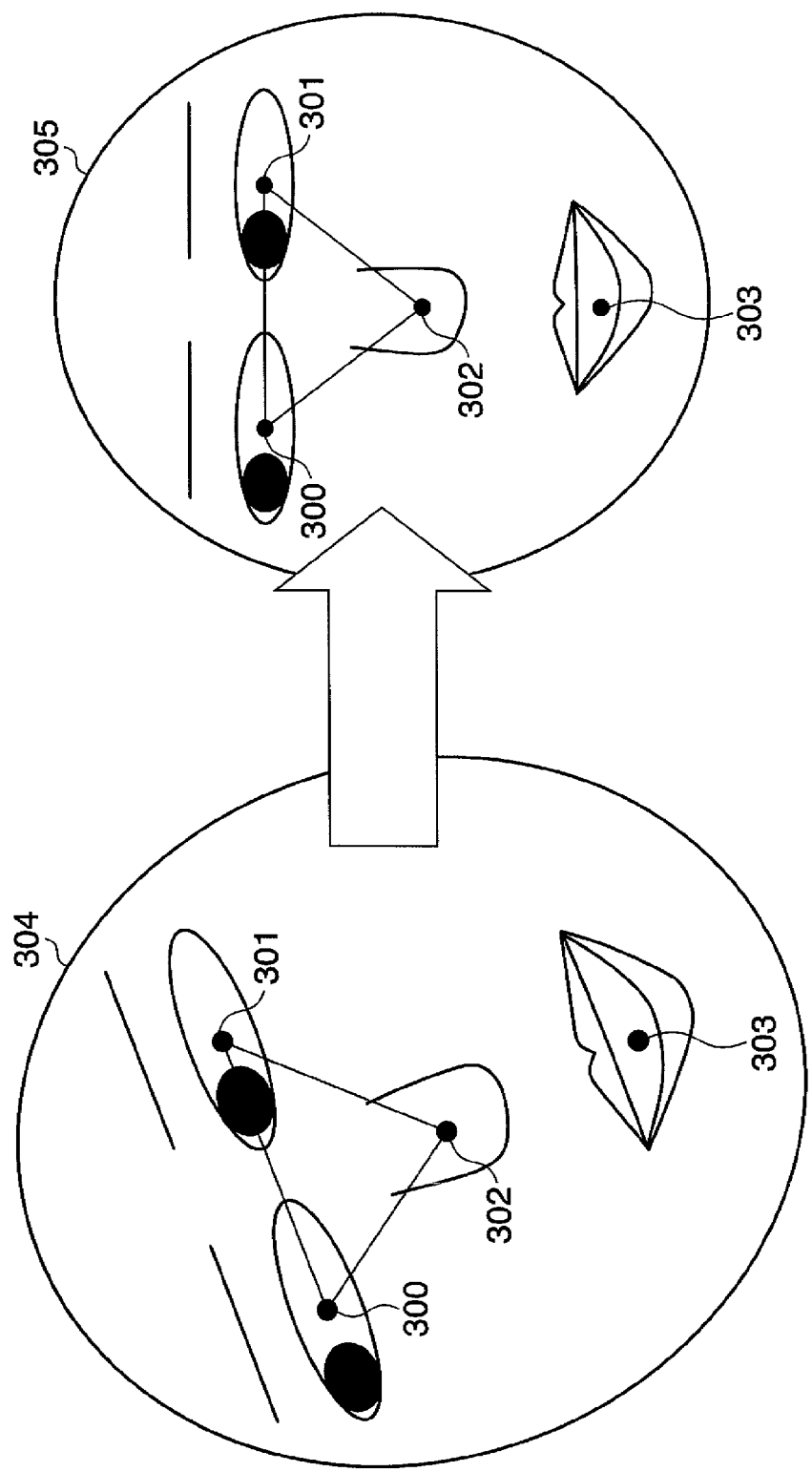
FIG. 5 is a view for explaining normalization processing by an image normalization unit.

FIG. 5 is a view for explaining the normalization processing by the image normalization unit 51. FIG. 5 shows face image data when the size and rotation direction of face image data undergo the normalization processing.

In this embodiment, as shown in FIG. 5, the normalization processing is implemented by executing Affine transformation so that a slant of a straight line that connects two points, i.e., the eye positions 300 and 301 has a predetermined slant (the slant agrees with the horizontal direction in the example of FIG. 5), and the distance between the eye positions 300 and 301 has a predetermined distance. That is, in this embodiment, as shown in FIG. 5, the size and rotation direction (orientation) of face image data 304 are normalized to face image data 305. Note that the normalization processing of the size and rotation direction of the face image data may be executed using the eye positions 300 and 301 and the mouth position 303, the face position 302 and mouth position 303, or the like. The normalization processing is not limited to these methods, and other methods may be used.

Figure 6:
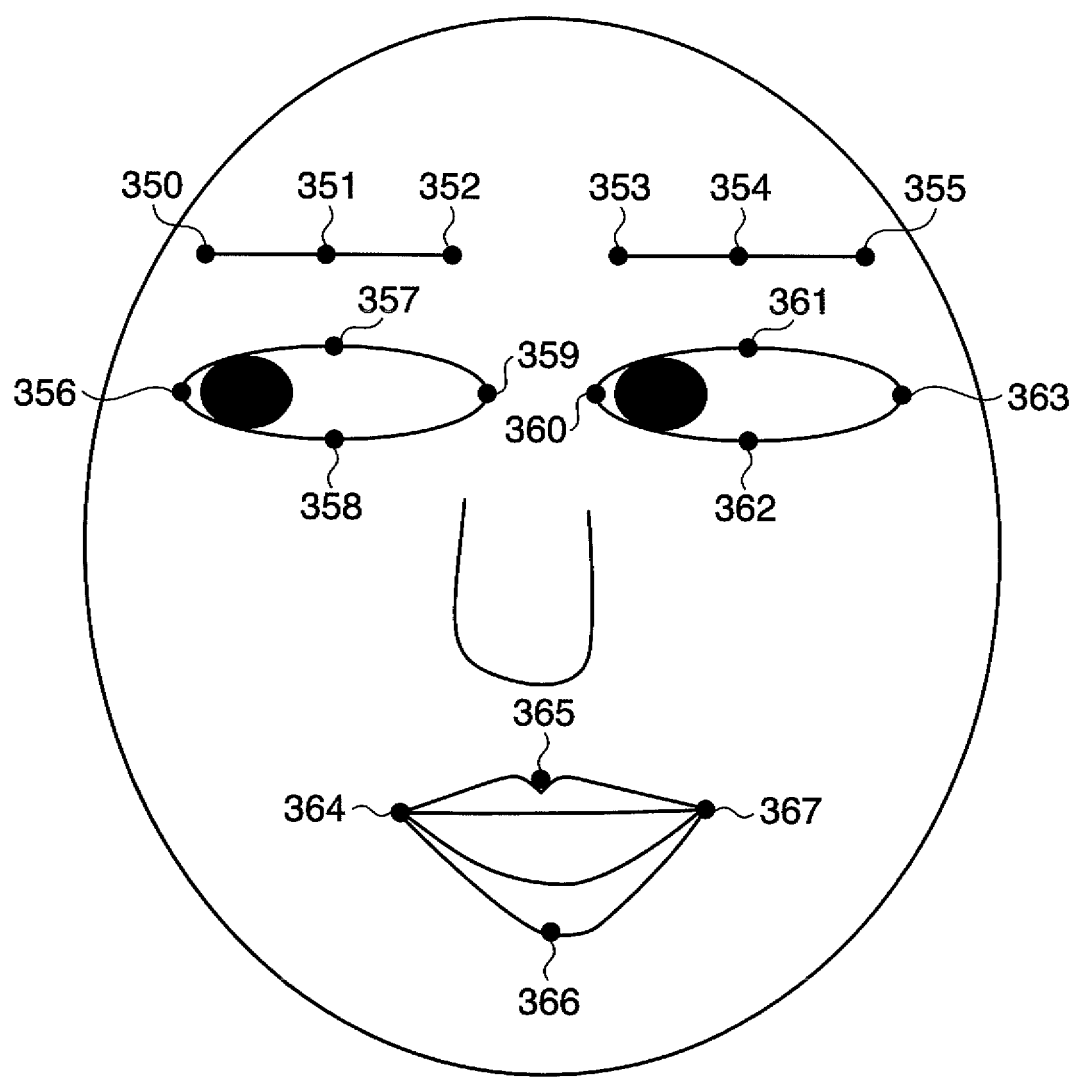
FIG. 6 is a view showing predetermined feature points detected by a feature point detection unit.

FIG. 6 is a view showing predetermined feature points detected by the feature point detection unit 153. The feature point detection region setting unit 152 sets regions used to detect feature points 350 to 367 shown in FIG. 6.

The detection region setting processing of feature points 350 to 355 associated with eyebrows shown in FIG. 6 will be described first.

Figure 8:
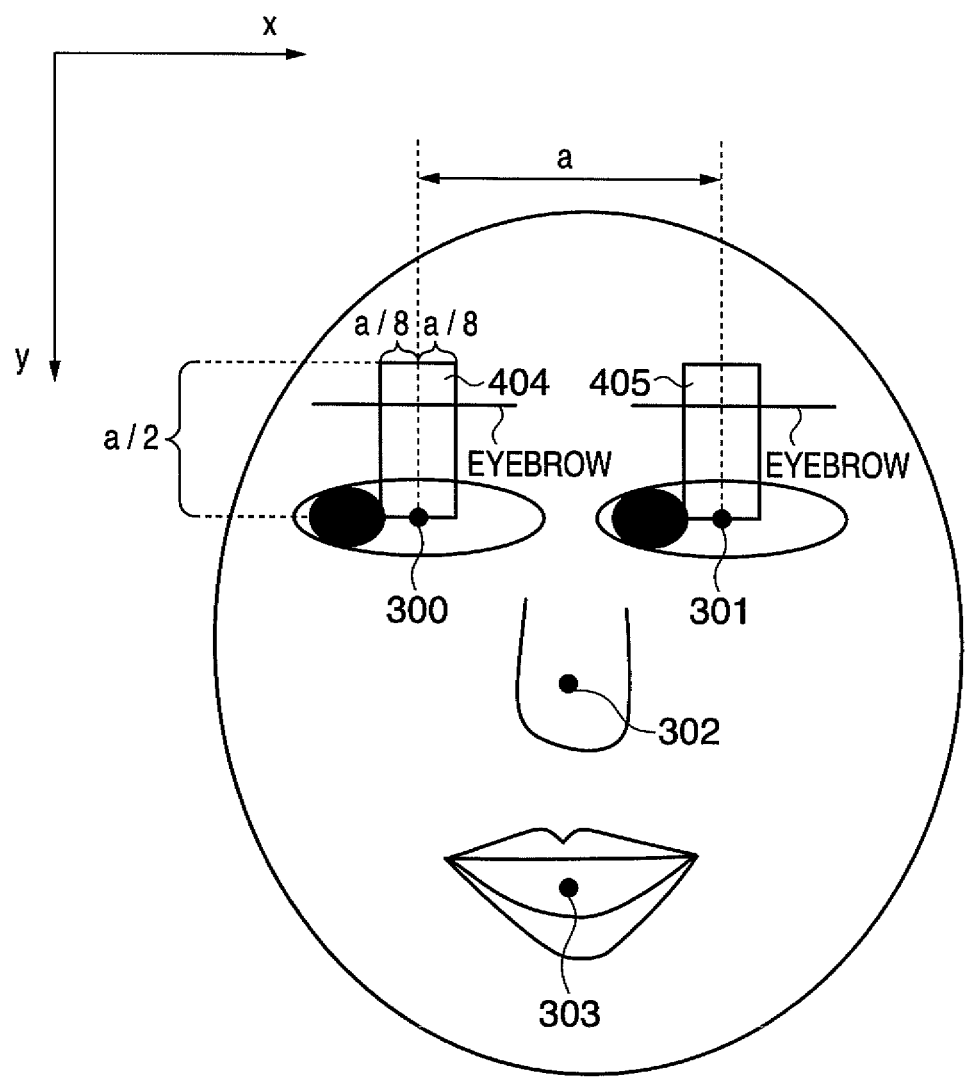
FIG. 8 is a view showing detection region setting processing of feature points associated with eyebrows shown in FIG. 6 executed by the feature point detection region setting unit.

FIGS. 7 and 8 are views showing the detection region setting processing of feature points associated with eyebrows shown in FIG. 6, which is executed by the feature point detection region setting unit 152.

Assume that a range in the x-direction of a detection region 400 used to detect the feature point 350 in FIG. 6 extends from {(the coordinate x of the left eye position 300)−(a/2)} to (the coordinate x of the left eye position 300), as shown in FIG. 7. Also, assume that a range in the y-direction of the detection region 400 extends from {(the coordinate y of the left eye position 300)−(a/2)} to (the coordinate y of the left eye position 300), as shown in FIG. 7. Note that the value a corresponds to the distance between the left eye position 300 and right eye position 301.

Assume that a range in the x-direction of a detection region 401 used to detect the feature point 352 in FIG. 6 extends from (the coordinate x of the left eye position 300) to {(the coordinate x of the left eye position 300)+(a/2)}, as shown in FIG. 7. Also, assume that a range in the y-direction of the detection region 401 extends from {(the coordinate y of the left eye position 300)−(a/2)} to (the coordinate y of the left eye position 300), as shown in FIG. 7.

Assume that a range in the x-direction of a detection region 404 used to detect the feature point 351 in FIG. 6 extends from {(the coordinate x of the left eye position 300)−(a/8)} to {(the coordinate x of the left eye position 300)+(a/8)}, as shown in FIG. 8. Also, assume that a range in the y-direction of the detection region 404 extends from {(the coordinate y of the left eye position 300)−(a/2)} to (the coordinate y of the left eye position 300), as shown in FIG. 8.

The setting methods of the detection regions 401 and 402, and 404 used to detect the feature points 350 to 352 associated with the left eyebrow have been described. Note that the setting methods of detection regions 402 and 403, and 405 used to detect the feature points 353 to 355 associated with the right eyebrow are implemented by the same methods as those for the left eyebrow.

The detection region setting processing of feature points 356 to 363 associated with the eyes shown in FIG. 6 will be described below.

Figure 9:
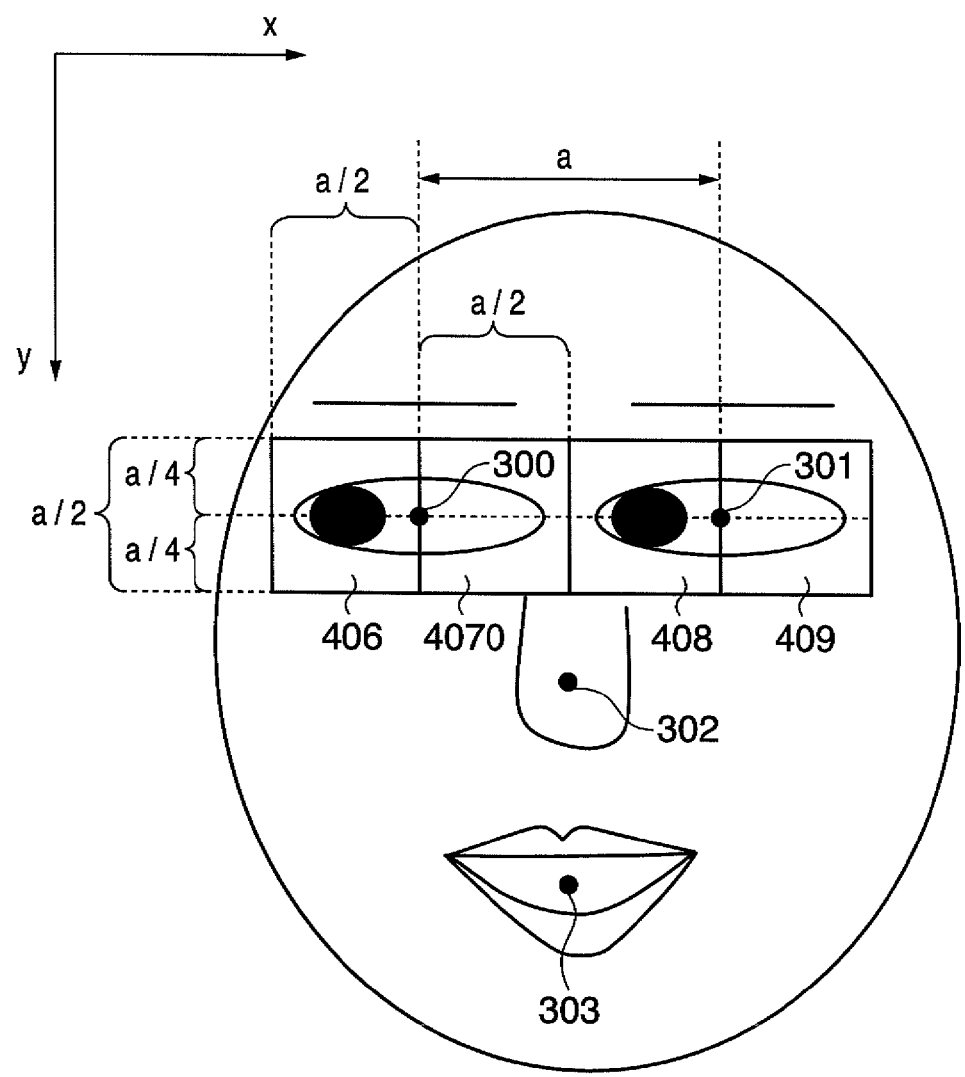
FIG. 9 is a view showing detection region setting processing of feature points associated with eyes shown in FIG. 6 executed by the feature point region detection setting unit.

FIGS. 9 and 10 are views showing the detection region setting processing of feature points associated with the eyes shown in FIG. 6, which is executed by the feature point detection region setting unit 152.

Assume that a range in the x-direction of a detection region 406 used to detect the feature point 356 in FIG. 6 extends from {(the coordinate x of the left eye position 300)−(a/2)} to (the coordinate x of the left eye position 300), as shown in FIG. 9. Also, assume that a range in the y-direction of the detection region 406 extends from {(the coordinate y of the left eye position 300)−(a/4)} to {(the coordinate y of the left eye position 300)+(a/4)}, as shown in FIG. 9.

Assume that a range in the x-direction of a detection region 4070 used to detect the feature point 359 in FIG. 6 extends from (the coordinate x of the left eye position 300) to {(the coordinate x of the left eye position 300)+(a/2)}, as shown in FIG. 9. Also, assume that a range in the y-direction of the detection region 4070 extends from {(the coordinate y of the left eye position 300)−(a/4)} to {(the coordinate y of the left eye position 300)+(a/4)}, as shown in FIG. 9.

Assume that a range in the x-direction of a detection region 410 used to detect the feature point 357 in FIG. 6 extends from {(the coordinate x of the left eye position 300)−(a/8)} to {(the coordinate x of the left eye position 300)+(a/8)}, as shown in FIG. 10. Also, assume that a range in the y-direction of the detection region 410 extends from {(the coordinate y of the left eye position 300)−(a/4)} to (the coordinate y of the left eye position 300), as shown in FIG. 10.

Assume that a range in the x-direction of a detection region 411 used to detect the feature point 358 in FIG. 6 extends from {(the coordinate x of the left eye position 300)−(a/8)} to {(the coordinate x of the left eye position 300)+(a/8)}, as shown in FIG. 10. Also, assume that a range in the y-direction of the detection region 411 extends from (the coordinate y of the left eye position 300) to {(the coordinate y of the left eye position 300)+(a/4)}, as shown in FIG. 10.

The setting methods of the detection regions 406 and 4070, and 410 and 411 used to detect the feature points 356 to 359 associated with the left eye have been described. Note that the setting methods of detection regions 408 and 409, and 412 and 413 used to detect the feature points 360 to 363 associated with the right eye are implemented by the same methods as those for the left eye.

The detection region setting processing of feature points 364 to 367 associated with the mouth shown in FIG. 6 will be described below.

Figure 11:
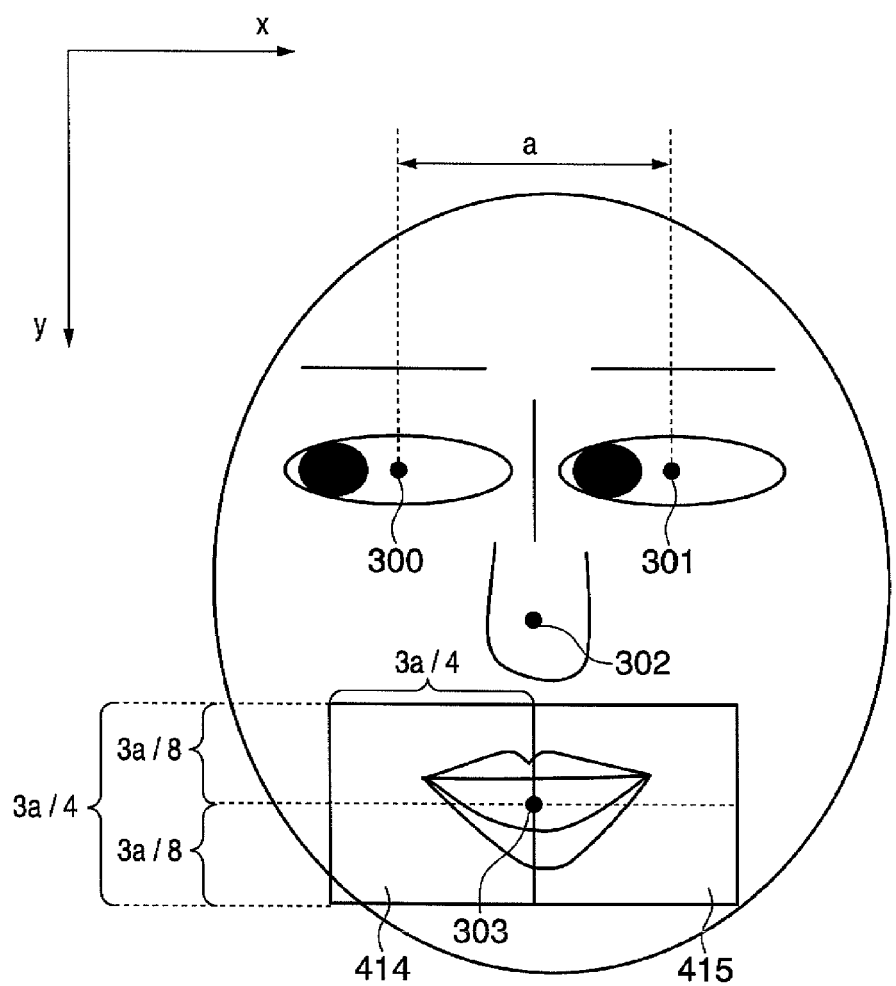
FIG. 11 is a view showing detection region setting processing of feature points associated with a mouth shown in FIG. 6 executed by the feature point detection region setting unit.
Figure 12:
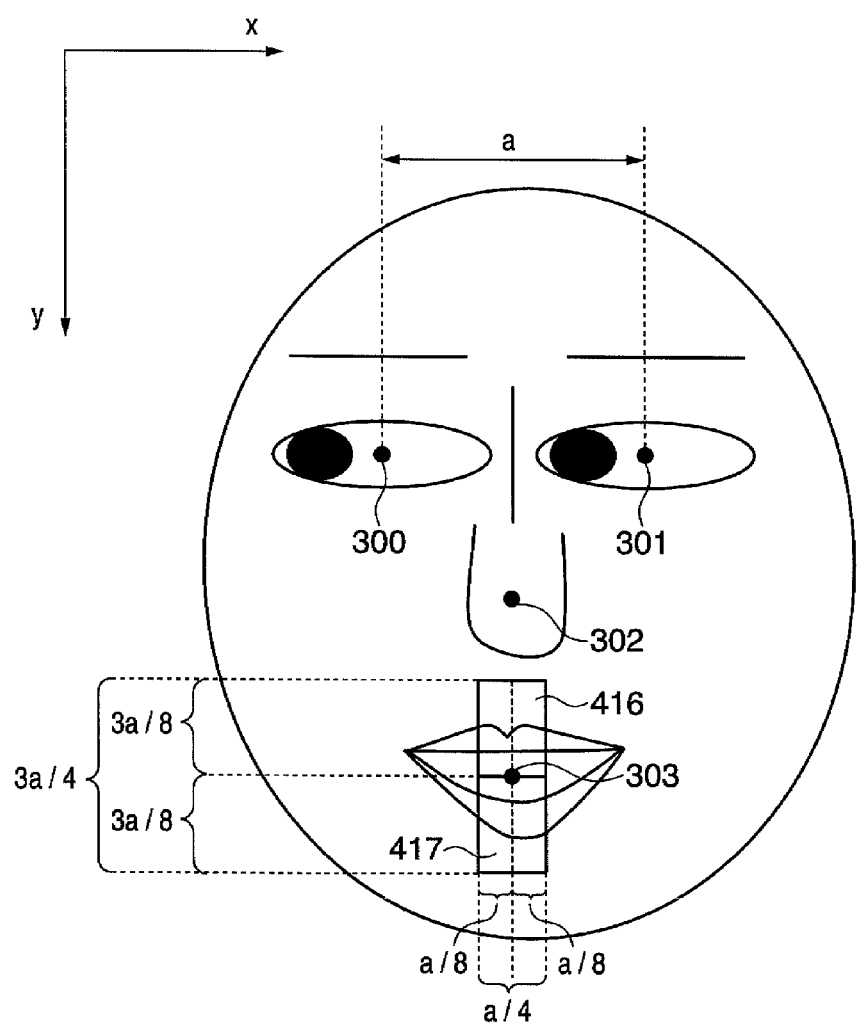
FIG. 12 is a view showing detection region setting processing of feature points associated with a mouth shown in FIG. 6 executed by the feature point detection region setting unit.

FIGS. 11 and 12 are views showing the detection region setting processing of feature points associated with the mouth shown in FIG. 6, which is executed by the feature point detection region setting unit 152.

Assume that a range in the x-direction of a detection region 414 used to detect the feature point 364 in FIG. 6 extends from {(the coordinate x of the mouth position 303)−(3a/4)} to (the coordinate x of the mouth position 303), as shown in FIG. 11. Also, assume that a range in the y-direction of the detection region 414 extends from {(the coordinate y of the mouth position 303)−(3a/8)} to {(the coordinate y of the mouth position 303)+(3a/8)}, as shown in FIG. 11.

Assume that a range in the x-direction of a detection region 415 used to detect the feature point 367 in FIG. 6 extends from (the coordinate x of the mouth position 303) to {(the coordinate x of the mouth position 303)+(3a/4)}, as shown in FIG. 11. Also, assume that a range in the y-direction of the detection region 415 extends from {(the coordinate y of the mouth position 303)−(3a/8)} to {(the coordinate y of the mouth position 303)+(3a/8)}, as shown in FIG. 11.

Assume that a range in the x-direction of a detection region 416 used to detect the feature point 365 in FIG. 6 extends from {(the coordinate x of the mouth position 303)−(a/8)} to {(the coordinate x of the mouth position 303)+(a/8)}, as shown in FIG. 12. Also, assume that a range in the y-direction of the detection region 416 extends from {(the coordinate y of the mouth position 303)−(3a/8)} to (the coordinate y of the mouth position 303), as shown in FIG. 12.

Assume that a range in the x-direction of a detection region 417 used to detect the feature point 366 in FIG. 6 extends from {(the coordinate x of the mouth position 303)−(a/8)} to {(the coordinate x of the mouth position 303)+(a/8)}, as shown in FIG. 12. Also, assume that a range in the y-direction of the detection region 417 extends from (the coordinate y of the mouth position 303) to {(the coordinate y of the mouth position 303)+(3a/8)}, as shown in FIG. 12.

Note that the aforementioned division methods of the image regions are not limited to those described in this embodiment. For example, the number of divided regions may be further increased.

The feature point detection unit 153 executes feature point detection processing using the face image data 305 which has undergone the normalization processing of the size and rotation direction by the image normalization unit 151 and the detection regions of the feature points set by the feature point detection region setting unit 152. As the feature point detection method in this case, a method of preparing, in advance, templates required to detect the feature points 350 to 367 shown in FIG. 6 such as the outer and inner acanthi, and the like as in face detection, and making detection within the feature point detection regions set by the feature point detection region setting unit 152 is used. Note that the feature point detection method is not limited to such specific method, and other methods may be used.

FIG. 13 is a view showing feature amounts to be extracted by the feature amount extraction unit 154.

The feature amount extraction unit 154 extracts predetermined feature amounts 450 to 464 from the feature points 350 to 367 detected by the feature point detection unit 153.

The feature amount extraction unit 154 extracts the following predetermined feature amounts. That is, the unit 154 extracts an eyebrow distance 450 from an x-distance between the feature points 352 and 353. The unit 154 extracts an eyebrow-upper lid distance 451 from a y-distance between the feature points 351 and 357, and an eyebrow-upper lid distance 452 from a y-distance between the feature points 354 and 361. The unit 154 extracts an eyebrow-inner canthus distance 453 from a y-distance between the feature points 352 and 359, and an eyebrow-inner canthus distance 454 from a y-distance between the feature points 353 and 360. The unit 154 extracts an eyebrow-outer canthus distance 455 from a y-distance between the feature points 350 and 356, and an eyebrow-outer canthus distance 456 from a y-distance between the feature points 355 and 363.

Also, the feature amount extraction unit 154 extracts an outer canthus-inner canthus distance 457 from an x-distance between the feature points 356 and 359 and an outer canthus-inner canthus distance 458 from an x-distance between the feature points 360 and 363. The unit 154 extracts an upper-lower lid distance 459 from a y-distance between the feature points 357 and 358, and an upper-lower lid distance 460 from a y-distance between the feature points 361 and 362. The unit 154 extracts an outer canthus-mouth end point distance 461 from a y-distance between the feature points 356 and 364, and an outer canthus-mouth end point distance 462 from a y-distance between the feature points 363 and 367. The unit 154 extracts a mouth end point distance 463 from an x-distance between the feature points 364 and 367. The unit 154 extracts an upper-lower lip distance 464 from a y-distance between the feature points 365 and 366.

The feature amount extraction unit 154 calculates variations of the feature amounts based on those obtained from expressionless face image data prepared in advance and those obtained from the image data which is to undergo facial expression recognition.

Figure 14:
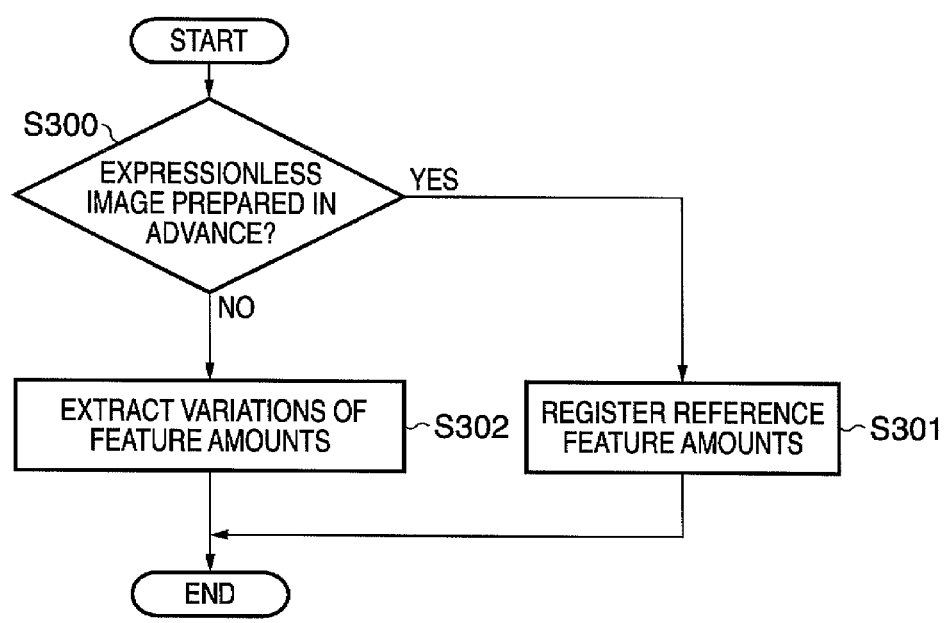
FIG. 14 is a flowchart showing the processing upon calculating variations based on the feature amounts extracted by the feature amount extraction unit.

FIG. 14 is a flowchart of the processing upon calculating the variations from the feature amounts extracted by the feature amount extraction unit 154.

The feature amount extraction unit 154 checks in step S300 if the feature amounts extracted by the feature amount extraction unit 154 are those of expressionless image data prepared in advance. As a result of checking, if the feature amounts extracted by the feature amount extraction unit 154 are those of expressionless image data, the feature amount extraction unit 154 stores the feature amounts extracted by the feature amount extraction unit 154 in, e.g., its internal memory as reference feature amounts in step S301.

On the other hand, as a result of checking in step S300, if the feature amounts extracted by the feature amount extraction unit 154 are not those of expressionless image data, i.e., if the feature amounts are those of the image data which is to undergo facial expression recognition, the process advances to step S302. In step S302, the feature amount extraction unit 154 computes the differences or ratios between the feature amounts extracted from the image data which is to undergo facial expression recognition, and those of the expressionless image data registered in step S301, thus calculating the variations from the expressionless image data.

In this case, the calculation processing of the variations of the feature amounts may be implemented by a method of computing the differences or ratios using previous frame image data, automatically extracted expressionless image data, or an average expressionless model to calculate the variations. Hence, this processing is not limited to the method described in this embodiment.

Figure 15:
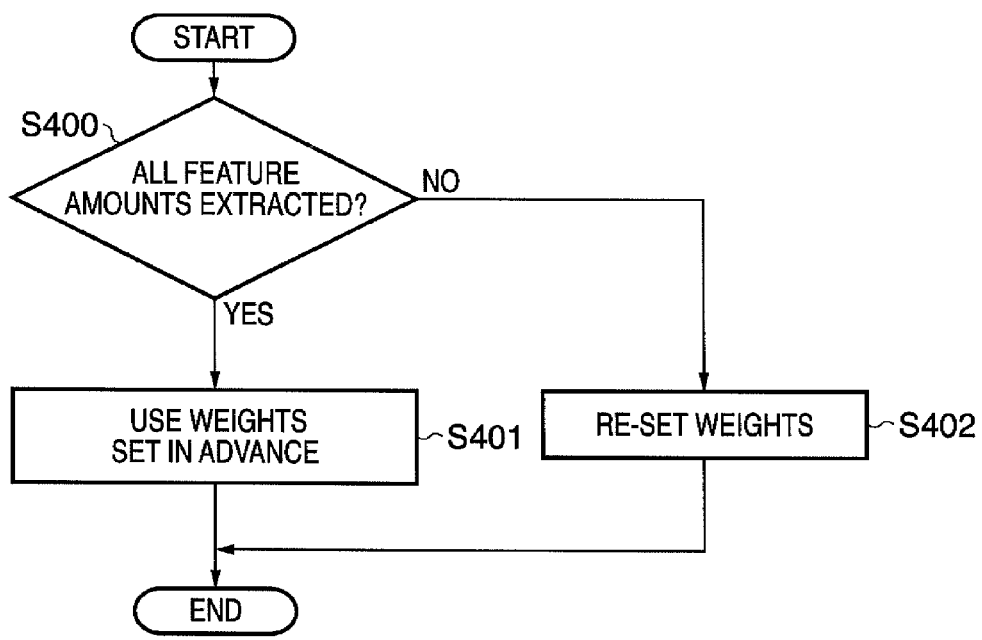
FIG. 15 is a flowchart showing the weight setting method by a weight setting unit based on the feature amount extraction results.

FIG. 15 is a flowchart showing the weight setting method based on the feature amount extraction results by the weight setting unit 155. FIGS. 16A and 16B are views showing an example of weighting LUTs (Look Up Tables) for the extracted feature amounts in correspondence with respective facial expression numbers. FIGS. 16A and 16B show LUTs (to be referred to "LUT1" hereinafter) assigned with facial expression numbers according to the types of facial expressions; FIG. 16A shows an LUT with facial expression number 1, FIG. 16B shows an LUT with facial expression number 2, . . . .

As shown in FIG. 15, the weight setting unit 155 checks in step S400 if the feature amount extraction unit 154 can extract all the predetermined feature amounts. As a result of checking, if the unit 154 can extract all the predetermined feature amounts, the unit 155 uses the weights set in advance for respective feature amounts of each facial expression in step S401.

On the other hand, as a result of checking in step S400, if the feature amount extraction unit 154 can extract not all the predetermined feature amounts (it cannot extract some predetermined feature amounts), as feature amounts which can be extracted, the weight setting unit 155 sets weights again for the respective feature amounts of each facial expression in step S402. Upon setting the weights again, the unit 155 refers to the LUT1 shown in FIG. 16A or 16B prepared in advance to set the weights for again the respective feature amounts of each facial expression.

Note that in this embodiment, causes of extraction failures of feature amounts include extraction failures of feature points by the feature point detection unit 153, setting failures of the detection regions used to extract feature points by the feature point detection region setting unit 152, and the like.

The generation method of the LUT1 will be described below.

Figure 17:
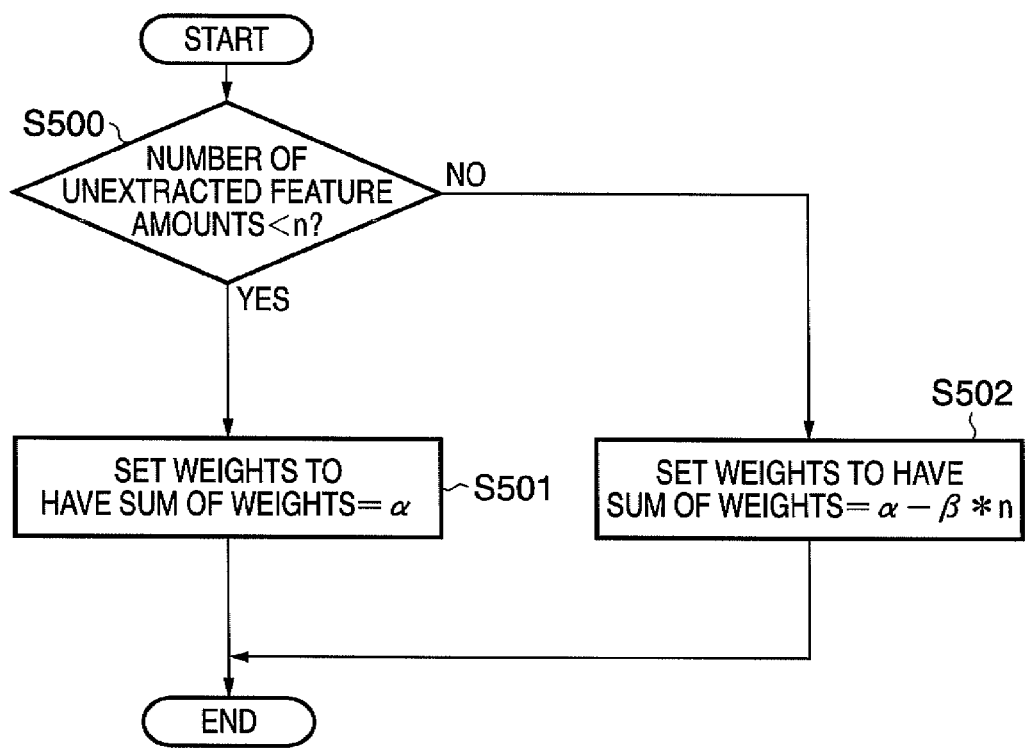
FIG. 17 is a flowchart showing the method of generating an LUT (LUT1) shown in FIG. 16A or 16B.

FIG. 17 is a flowchart showing the generation method of the LUT (LUT1) shown in FIG. 16A or 16B. With this generation method of the LUT1, the sum of weights is changed according to the number of unextracted feature amounts.

That is, for a certain facial expression, the weight setting unit 155 checks in step S500 if the number of undetected feature amounts is less than n. As a result of checking, if the number of undetected feature amounts is less than n, the unit 155 sets weights so that the sum of weights equals $\alpha$ ($\alpha$ is a constant) in step S501.

On the other hand, as a result of checking in step S500, if the number of undetected feature amounts is equal to or larger than n, the weight setting unit 155 sets the sum of weights to be $\alpha - \beta*n$ ($\beta$ is a constant), and assigns weights to the feature amounts according to the importance levels of the extracted feature amounts, in step S502.

For example, if n=1, the sum of weights upon detection of unextracted feature amounts is not equal to that of weights upon extraction of all the feature amounts, but the sum of weights is reduced in correspondence with the number of unextracted feature amounts. Even when the number of undetected feature amounts is equal to or larger than n, the weighting may be done so that the sum of weights equals $\alpha$.

The reason why the weights are re-set according to the undetected feature amounts will be described below using practical examples.

Figure 18:
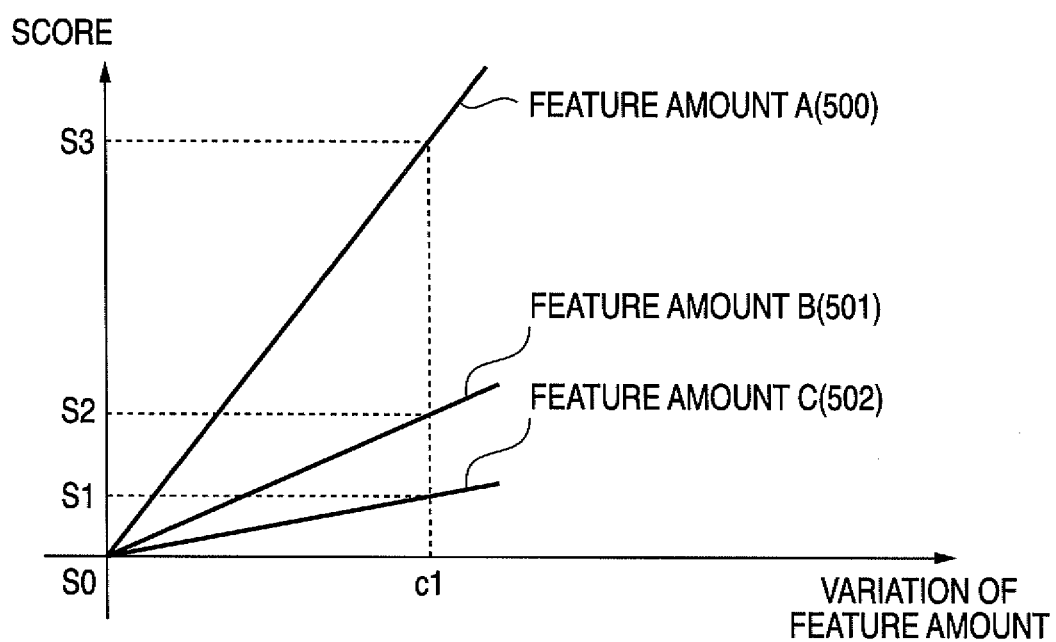
FIG. 18 is a graph showing an example of the importance levels (weights) of respective feature amounts extracted from respective feature points.

FIG. 18 is a graph showing an example of the importance levels (weights) of the feature amounts extracted from the feature points.

For example, assume that the processing for weighting a smile facial expression of facial expressions is executed when the feature point detection unit 153 cannot detect some feature points, and the feature amount extraction unit 154 cannot extract feature amount A.

Referring to FIG. 18, each weight for weighting corresponds to "slant" when the abscissa plots a variation of a feature amount and the ordinate plots a score. In this case, feature amount A 500 has a higher importance level (weight) used to determine a smile facial expression or not than other feature amounts B 501 and C 502. However, since feature amount A 500 cannot be extracted, it cannot be used.

Hence, a smile facial expression is normally determined using other feature amounts B 501 and C 502 except for feature amount A 500 with a large weight. However, the currently set weights are used to determine a smile facial expression only when all feature amounts A to C are extracted.

For this reason, when a smile facial expression is determined using these weights, since feature amount A 500 which cannot be extracted has a large contribution, a total score that represents the degree of smile facial expression assumes a very small value. Hence, in this embodiment, the weights are changed according to the LUT1 shown in FIG. 16A or 16B.

Figure 19:
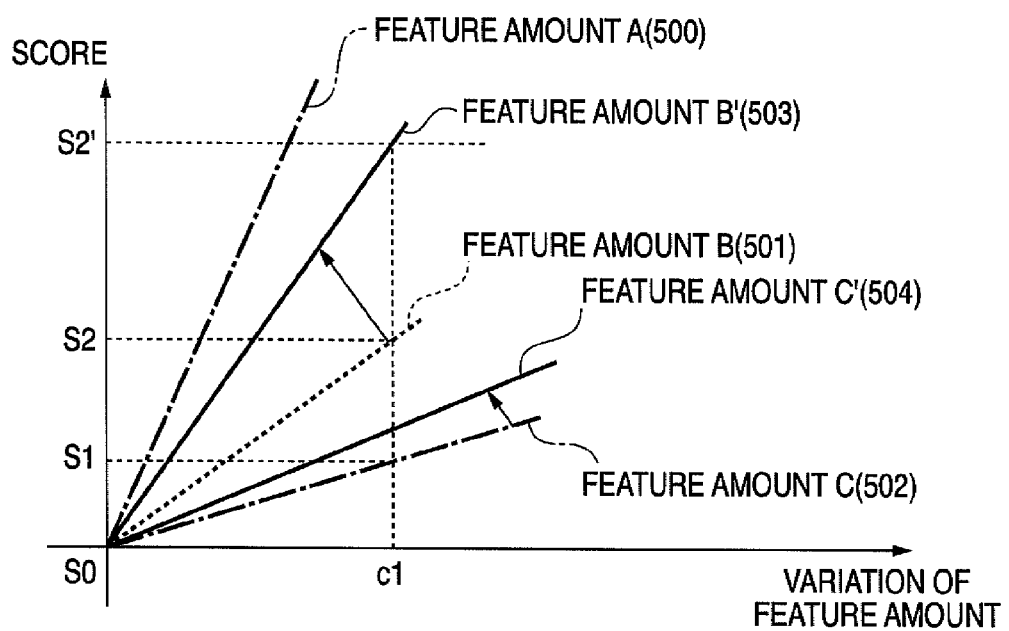
FIG. 19 is a graph showing an example of a case in which the weights of other extracted feature amounts B and C are changed according to the LUT1 when feature amount A of the feature amounts shown in FIG. 18 is not extracted.

FIG. 19 is a graph showing an example of a case in which the weights of other extracted feature amounts B and C are changed according to the LUT1 when feature amount A of the feature amounts shown in FIG. 18 cannot be extracted.

For example, as shown in FIG. 19, the weight of extracted feature amount B 501 is changed so as to feature amount B' 503, and that of feature amount C 502 is changed so as to feature amount C' 504 using the LUT1 shown in FIG. 16A or 16B.

In the examples of FIGS. 18 and 19, the weight of each feature amount is defined by the slant of a linear function. However, in this embodiment, the weight of each feature amount is not limited to the slant of the linear function. In this way, by setting the weights again for the extracted ones of all the feature amounts, the facial expression recognition processing can be executed using the extracted feature amounts and their weights.

The facial expression determination unit 156 calculates scores of respective facial expressions, and determines a facial expression with a highest score as that of a person (object) of image data which is to undergo facial expression recognition. With the aforementioned processes, the facial expression recognition processing in step S212 in FIG. 2 is implemented.

As an example of the calculation method of a score of each facial expression, a score ($Score_i^N$) for a feature amount i with a facial expression number N is calculated using a predetermined function func based on a feature amount variation li and a weight wi for the feature amount with the facial expression number N according to equation (1) below. Note that the predetermined function func corresponds to each linear function shown in FIGS. 18 and 19. Then, the calculated scores ($Score_i^N$) as many as the number n of feature amounts are summed up according to equation (2) below, thus calculating a facial expression score (SumScoreN) of the facial expression number N.

$$Score_i^N = func(1_i, w_i^N) \qquad (1)$$

$$SumScoreN = \sum_{i=0}^{n} Score_i^N \qquad (2)$$

where N: the facial expression number, i: the feature amount number, $l_i$: a variation of the feature amount i, n: the number of feature amounts, $w_i^N$: the weight for the feature amount i with the facial expression number N, func: the score calculation function, $Score_i^N$: a score of the facial expression number N calculated from the feature amount i, and SumScoreN: the total score of the facial expression number N.

The description will revert to FIG. 2.

After the facial expression recognition processing in step S212 in FIG. 2 is implemented by the aforementioned processes, the process advances to step S213.

The system controller 112 checks in step S213 if the facial expression determined as a result of the facial expression recognition processing in step S212 is a predetermined facial expression (e.g., smile) which is set in advance. As a result of checking, if the facial expression determined as a result of the facial expression recognition processing in step S212 is a predetermined facial expression which is set in advance, the process advances to step S214.

In step S214, the system controller 112 controls to perform an image sensing operation using the image sensing element 103, and to write (store) the obtained image data in the memory 108.

In step S215, the system controller 112 controls to display the image data obtained as a result of the image sensing operation in step S214 on the display unit 110 as a quick review.

In step S216, the system controller 112 controls, e.g., the digital signal processor 107 to execute image compression processing of the sensed image data written in the memory 108, and then executes recording processing for recording the processed image data in a recording medium via the interface 111. Prior to the recording processing in the recording medium, other image processes such as an achromatize process for achromatizing high- or low-luminance colors and the like may be executed as needed.

After completion of the processing in step S216, or if it is determined in step S213 that the facial expression determined as a result of the facial expression recognition processing in step S212 is not a predetermined facial expression which is set in advance, the process advances to step S217.

The system controller 112 checks in step S217 if the automatic image sensing operation is to end by detecting, e.g., if the user presses the shutter switch (not shown) of the image sensing device 100 again to turn it on.

As a result of checking in step S217, if the automatic image sensing operation is not to end, the process returns to step S211. On the other hand, as a result of checking in step S217, if the automatic image sensing operation is to end, the processing in the flowchart shown in FIG. 2 ends.

According to the image sensing device of the first embodiment, even when not all the predetermined feature amounts are detected, the weights for the predetermined feature amounts that can be extracted are changed, and the facial expression of a person in image data is recognized, thus implementing the recognition processing with high precision.

Note that the first embodiment has explained the case wherein the digital still camera is applied as an example of the image sensing device 100. For example, a video camera or the like may be applied. Also, a predetermined program may be executed by a computer to search moving image data or still image data in a database for face image data of a predetermined facial expression.

(Second Embodiment)

The second embodiment of the present invention will be described in detail hereinafter with reference to the accompanying drawings.

The arrangement of an image sensing device (image processing apparatus) according to the second embodiment is the same as that of the image sensing device according to the first embodiment shown in FIG. 1, except for the internal arrangement of the digital signal processor 107. That is, this embodiment adopts a digital signal processor 207 shown in FIG. 20 in place of the digital signal processor 107 according to the first embodiment shown in FIG. 1. The control operation of the image sensing device (image processing apparatus) according to the second embodiment is the same as that of the image sensing device according to the first embodiment shown in FIG. 2, except for the contents of the facial expression recognition processing in step S212.

Figure 20:
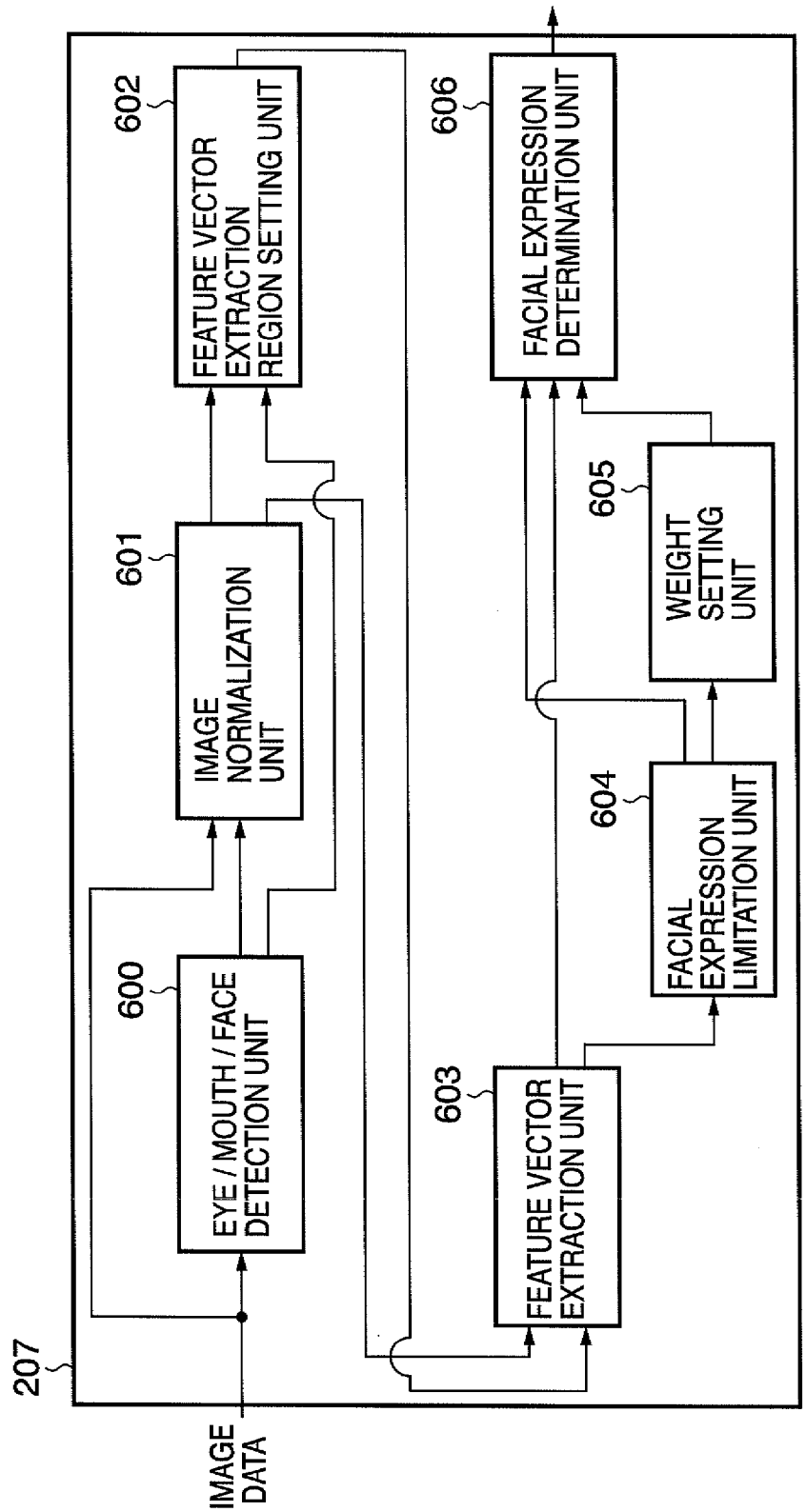
FIG. 20 is a block diagram showing the functional arrangement associated with facial expression recognition processing executed by a digital signal processor according to the second embodiment.

FIG. 20 is a block diagram showing the functional arrangement associated with the facial expression recognition processing to be executed by the digital signal processor 207 of the second embodiment.

An eye/mouth/face detection unit 600 shown in FIG. 20 detects the face, eye, and mouth positions of a specific object in an image based on image data by applying predetermined processing to the image data (digital signal) output from the A/D converter 105.

An image normalization unit 601 executes normalization processing of a face image size and rotation direction (orientation) in face image data in the image data based on the information of the eye, mouth, and face positions detected by the eye/mouth/face detection unit 600.

A feature vector extraction region setting unit 602 sets respective extraction regions used to extract feature vectors using the information of the eye, mouth, and face positions detected by the eye/mouth/face detection unit 600, and the image data normalized by the image normalization unit 601.

A feature vector extraction unit 603 extracts feature vectors using the extraction regions set by the feature vector extraction region setting unit 602 and the image data normalized by the image normalization unit 601. Note that the feature vector extraction unit 603 forms a feature extraction unit which extracts a plurality of features in an object from input image data.

A facial expression limitation unit 604 limits a range of facial expressions of a person who is to undergo facial expression recognition processing, based on the extraction results of the feature vectors by the feature vector extraction unit 603.

A weight setting unit 605 weights the feature vectors in a facial expression limited by the facial expression limitation unit 604 using, e.g., the LUT1 shown in FIG. 16A or 16B.

A facial expression determination unit 606 executes facial expression recognition processing using the information of each facial expression limited by the facial expression limitation unit 604, the weights set by the weight setting unit 605, and the feature vectors extracted by the feature vector extraction unit 603. The facial expression determination unit 606 determines, as a result of the facial expression recognition processing, a facial expression with a highest score of those limited by the facial expression limitation unit 604 as a facial expression of the person (object) of the image data which is to undergo facial expression recognition.

This facial expression recognition processing will be described in detail below.

The eye/mouth/face detection unit 600 and image normalization unit 601 respectively execute the same processes as those of the eye/mouth/face detection unit 150 and image normalization unit 151 in the first embodiment.

Details of the processing of the feature vector extraction region setting unit 602 will be described below.

Figure 21:
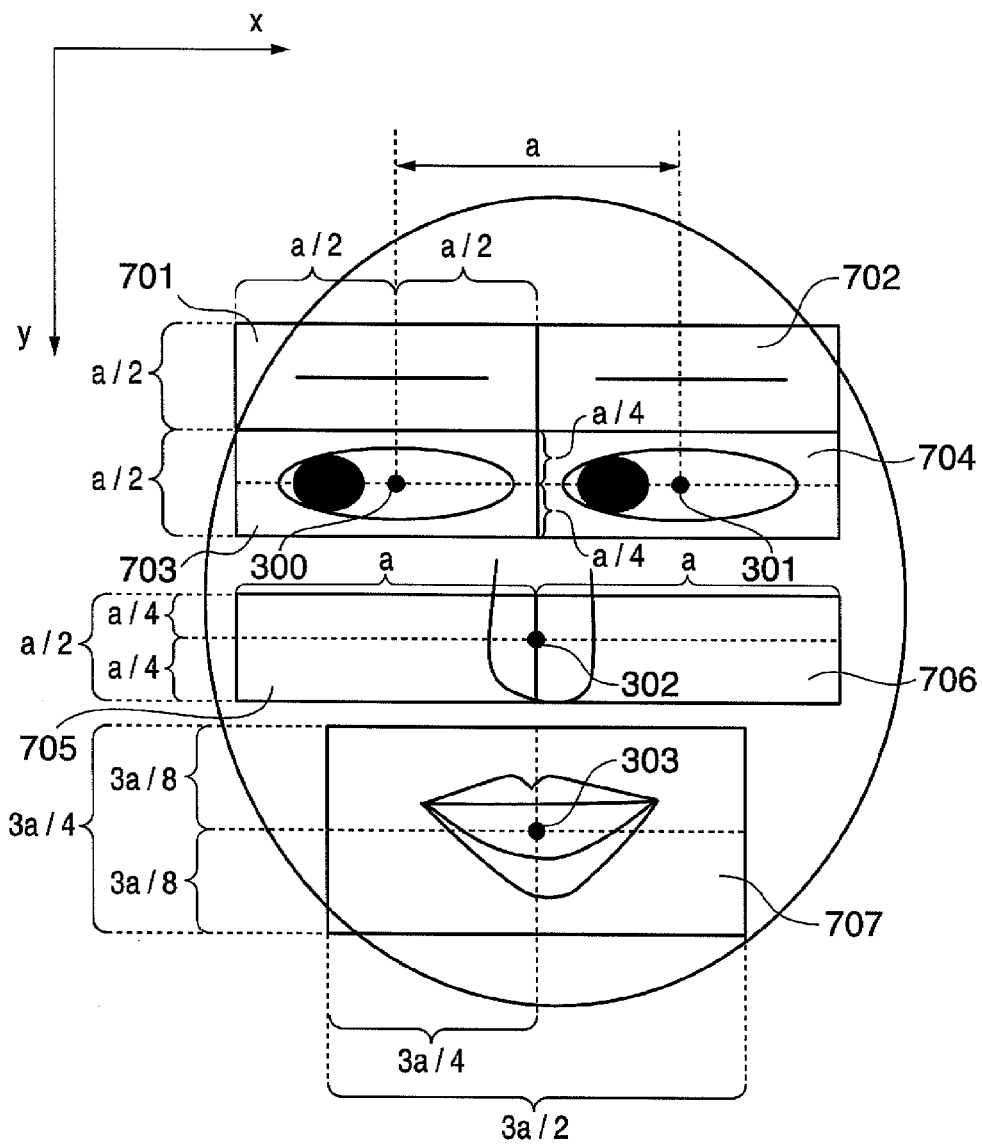
FIG. 21 is a view showing processing which is executed by a feature vector extraction region setting unit to set extraction regions from which feature vectors are to be extracted.

FIG. 21 is a view showing the processing which is executed by the feature vector extraction region setting unit 602 to set extraction regions from which feature vectors are to be extracted. FIG. 21 shows feature vector extraction regions 701 to 707 set by the feature vector extraction region setting unit 602. Also, let a be an x-distance between the left eye position 300 and right eye position 301.

Assume that a range in the x-direction of the feature vector extraction region 701 shown in FIG. 21 extends from {(the coordinate x of the left eye position 300)−(a/2)} to {(the coordinate x of the left eye position 300)+(a/2)}. Also, assume that a range in the y-direction of the feature vector extraction range 701 extends from {(the coordinate y of the left eye position 300)−(3a/4)} to {(the coordinate y of the left eye position 300)−(a/4)}.

Assume that a range in the x-direction of the extraction region 703 shown in FIG. 21 extends from the {(the coordinate x of the left eye position 300)−(a/2)} to {(the coordinate x of the left eye position 300) (a/2)}. Also, assume that a range in the y-direction of the extraction region 703 extends from {(the coordinate y of the left eye position 300)−(a/4)} to {(the coordinate y of the left eye position 300)+(a/4)}.

Assume that a range in the x-direction of the extraction region 705 shown in FIG. 21 extends from {(the coordinate x of the face position 302)−a} to (the coordinate x of the face position 302). Also, assume that a range in the y-direction of the extraction region 705 extends from {(the coordinate y of the face position 302)−(a/4)} to {(the coordinate y of the face position 302)+(a/4)}.

The setting methods of the feature vector extraction regions 701, 703, and 705 on the left side of the face image data have been described. Likewise, the setting methods of the extraction regions 702, 704, and 706 on the right side of the face image data are implemented by the same methods as those of the extraction regions on the left side.

Assume that a range in the x-direction of the extraction region 707 shown in FIG. 21 extends from {(the coordinate x of the mouth position 303)—(3a/4)} to {(the coordinate x of the mouth position 303)+(3a/4)}. Also, assume that a range in the y-direction of the extraction region 707 extends from {(the coordinate y of the mouth position 303)−(3a/8)} to {(the coordinate y of the mouth position 303)+(3a/8)}.

Note that the aforementioned division methods of the image regions are not limited to those described in this embodiment. For example, the number of divided regions may be further increased.

The feature vector extraction unit 603 generates edge image data by applying an edge detection filter such as a Sobel filter or the like to the image data normalized by the image normalization unit 601.

The feature vector extraction unit 603 then extracts feature vectors as output values themselves of the edge detection filters using the extraction regions set by the feature vector extraction region setting unit 602 and the output values of the edge detection filter.

For example, let a(i, j) be a filter output value of an (i, j) component in a certain n1×m1 pixel region: Then, the feature vector extraction unit 603 calculates an (n1×m1)-dimensional feature vector A ( . . . , a(i, j), . . . ). The unit 603 repeats this calculation as many as the number of predetermined extraction regions to extract feature vectors as many as the number N of predetermined extraction regions from the edge face image data. The feature vectors of the N filter output values extracted from the predetermined extraction regions are used in the subsequent facial expression determination processing.

Note that the aforementioned filter may use other types of filters, or normalized luminance image data itself may be used without any filter processing. In this embodiment, causes of extraction failures of feature vectors include acquisition failures of the output values of the predetermined filter, setting failures of the extraction regions used to extract feature vectors, and the like.

The facial expression limitation unit 604 limits a range of facial expressions of a person who is to undergo the facial expression recognition processing based on the setting results of the extraction regions of the feature vector extraction region setting unit 602 or the extraction results of the feature vectors by the feature vector extraction unit 603.

FIG. 22 is a view showing an example of an LUT used upon execution of the facial expression limitation processing by the facial expression limitation unit 604. In the following description, the LUT shown in FIG. 22 will be referred to as "LUT2".

When feature vectors cannot be extracted from unset region A, i.e., extraction region A, facial expression recognition processing is applied to only facial expressions corresponding to facial expression number 1, facial expression number 2, . . . with reference to the LUT2 shown in FIG. 22.

For example, when the eye positions 300 and 301 cannot be detected due to some accessories, and the feature vector extraction regions 701 to 704 shown in FIG. 21 cannot be set, i.e., when feature vectors cannot be extracted from these extraction regions, the facial expression recognition processing of only a smile facial expression is executed with reference to the LUT2 which is prepared in advance and shown in FIG. 22.

As described above, for example, since the smile facial expression is characterized in that a part around a mouth generally changes largely, the part around the mouth has a high importance level required to determine the smile facial expression. Hence, when feature vectors cannot be extracted from the feature vector extraction regions 701 to 704, a change in part around the mouth is analyzed based on feature vectors extracted from the extraction region 707. As a result, only a limited facial expression such as a smile facial expression or the like with a large degree of change (i.e., which can undergo recognition processing with high precision) can undergo recognition processing.

Figure 23:
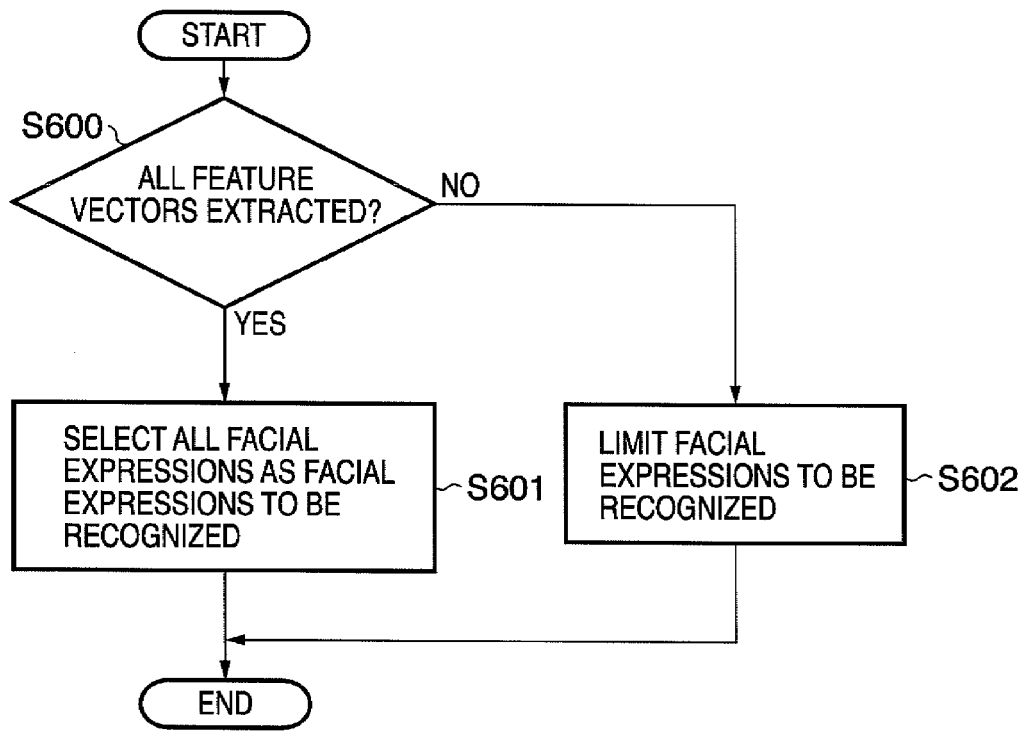
FIG. 23 is a flowchart showing the processing by the facial expression limitation unit.

FIG. 23 is a flowchart showing the processing by the facial expression limitation unit 604.

The facial expression limitation unit 604 checks in step S600 if the feature vector extraction unit 603 extracts all (N) feature vectors.

As a result of checking in step S600, if the feature vector extraction unit 603 extracts all (N) feature vectors, the facial expression limitation unit 604 applies recognition processing to all facial expressions without limiting facial expressions which are to undergo recognition processing in step S601.

On the other hand, as a result of checking in step S600, if the feature vector extraction unit 603 can extract not all (N) feature vectors (it cannot extract some feature vectors), the process advances to step S602. In step S602, the facial expression limitation unit 604 limits facial expressions which are to undergo recognition processing using, e.g., the aforementioned LUT2.

Figure 24:
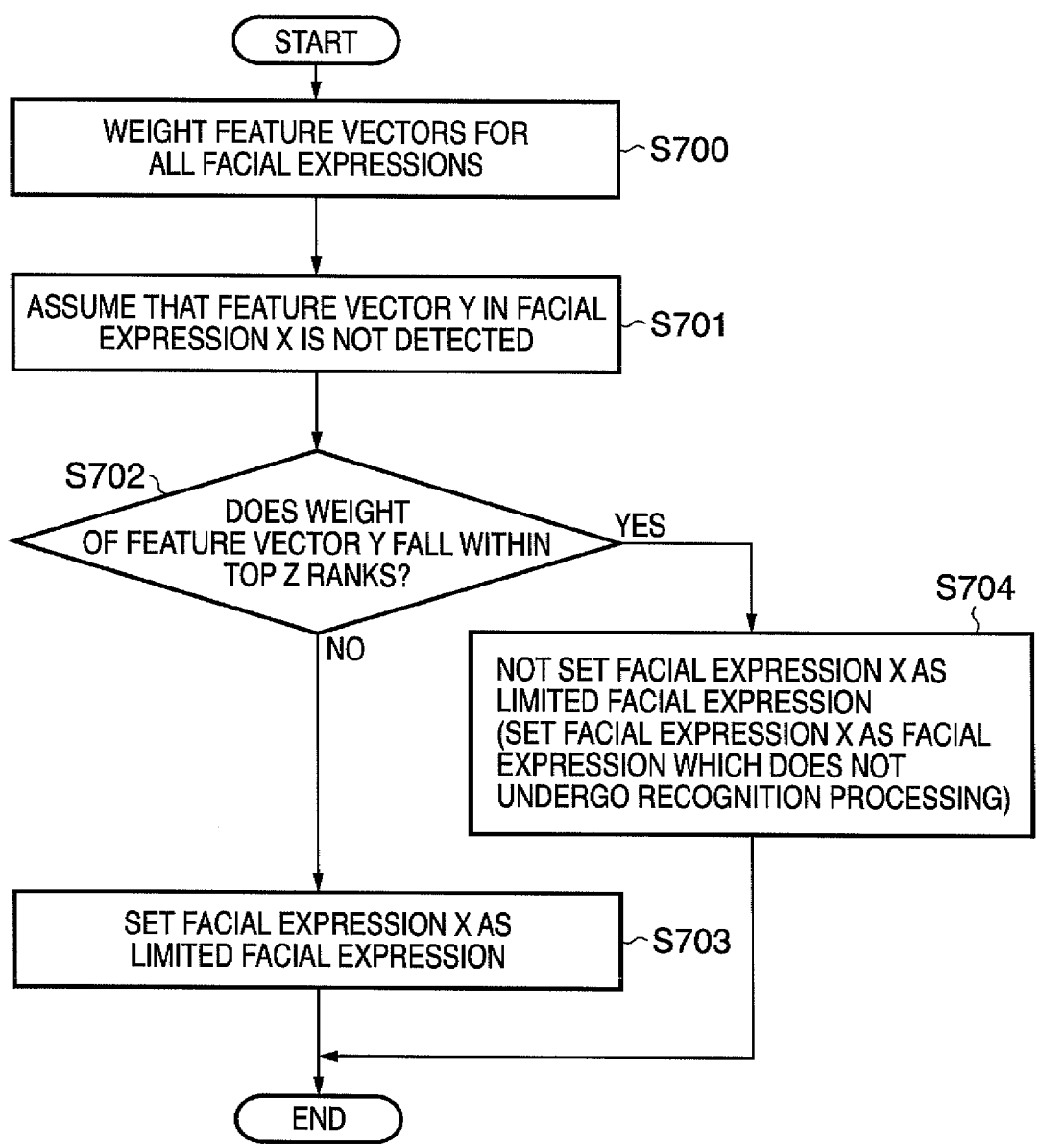
FIG. 24 is a flowchart showing the generation method of an LUT (LUT2) shown in FIG. 22 used to limit facial expressions.

FIG. 24 is a flowchart showing the generation method of the LUT (LUT2) shown in FIG. 22 used to limit facial expressions.

In step S700, the facial expression limitation unit 604 weights feature vectors for each of all facial expressions.

The facial expression limitation unit 604 assumes in step S701 that feature vector Y cannot be extracted for certain facial expression X.

The facial expression limitation unit 604 checks in step S702 if the weight for feature vector Y falls within top Z ranks in facial expression X.

As a result of checking in step S702, if the weight for feature vector Y does not fall within top Z ranks in facial expression X, the facial expression limitation unit 604 sets facial expression X as a facial expression, which is to undergo recognition processing even when feature vector Y is not detected, i.e., a limited facial expression, in step S703.

On the other hand, as a result of checking in step S702, if the weight for feature vector Y falls within top Z ranks in facial expression X, the facial expression limitation unit 604 sets facial expression X as a facial expression which does not undergo recognition processing when feature vector Y is not detected in step S704.

The weight setting unit 605 prepares a weighting LUT3 in advance for feature vectors of facial expressions limited by the facial expression limitation unit 604 as in the LUT1 shown in FIG. 16A or 16B, and sets weights with reference to the weighting LUT3.

The facial expression determination unit 606 calculates similarities between reference feature vectors corresponding to each of facial expressions limited by the facial expression limitation unit 604, and feature vectors extracted by the feature vector extraction unit 603. After that, the facial expression determination unit 606 sums up the similarities obtained from respective feature vectors for each facial expression to calculate a total similarity of the facial expressions, and determines a facial expression with a highest similarity as that of a person (object) of the image data which is to undergo facial expression recognition.

Note that the aforementioned reference feature vectors are averages of feature vectors calculated from respective regions of respective facial expressions by preparing a large-volume database of a plurality of persons, which include various facial expressions per person. That is, feature vector 1 is calculated from region d of facial expression 1 for person A, and feature vector 2 is similarly calculated from region d of facial expression 1 for person B. Such calculation is made for a plurality of persons, and an average of these calculated feature vectors is used as a reference feature vector.

A method of calculating a similarity between a reference feature vector and a feature vector extracted by the feature vector extraction unit 603 will be described below.

For example, as described in Non-patent reference 3 above, reference feature vectors extracted from respective regions undergo principal component analysis to determine partial spaces each of which is configured by top k eigenvectors. Then, feature vectors are projected into the partial spaces determined from the reference feature vectors, and values obtained by multiplying reciprocal numbers of their Euclidean distances by the weights set by the weight setting unit 605 are calculated as similarities for respective feature vectors. Of limited facial expressions, a facial expression with a largest sum total of similarities is determined as a facial expression of a person (object) of the image data which is to undergo facial expression recognition.

Note that the reference feature vectors may be extracted by methods other than that of this embodiment. Also, a similarity between two feature vectors may be calculated using elements other than the Euclidean distances. A method other than that which defines a value obtained by multiplying the reciprocal number of a Euclidean distance by the weight as a similarity may be adopted. Furthermore, a plurality of input images may be prepared, and a limited mutual partial space method described in patent reference 5 above or the like may be used.

According to the image sensing device of the second embodiment, even when a predetermined feature vector cannot be extracted, since facial expressions which are to undergo recognition processing are limited, the recognition processing of a facial expression of a person in the image data can be precisely executed.

Note that the second embodiment has explained the case wherein the digital still camera is applied as an example of the image sensing device 100 as in the first embodiment. For example, a video camera or the like may be applied. Also, a predetermined program may be executed by a computer to search moving image data or still image data in a database for face image data of a predetermined facial expression.

(Third Embodiment)

The third embodiment of the present invention will be described in detail hereinafter with reference to the accompanying drawings.

The arrangement of an image sensing device (image processing apparatus) according to the third embodiment is the same as that of the image sensing device according to the first embodiment shown in FIG. 1, except for the internal arrangement of the digital signal processor 107. That is, this embodiment adopts a digital signal processor 307 shown in FIG. 25 in place of the digital signal processor 107 according to the first embodiment shown in FIG. 1. The control operation of the image sensing device (image processing apparatus) according to the third embodiment is the same as that of the image sensing device according to the first embodiment shown in FIG. 2, except for the contents of the facial expression recognition processing in step S212.

Figure 25:
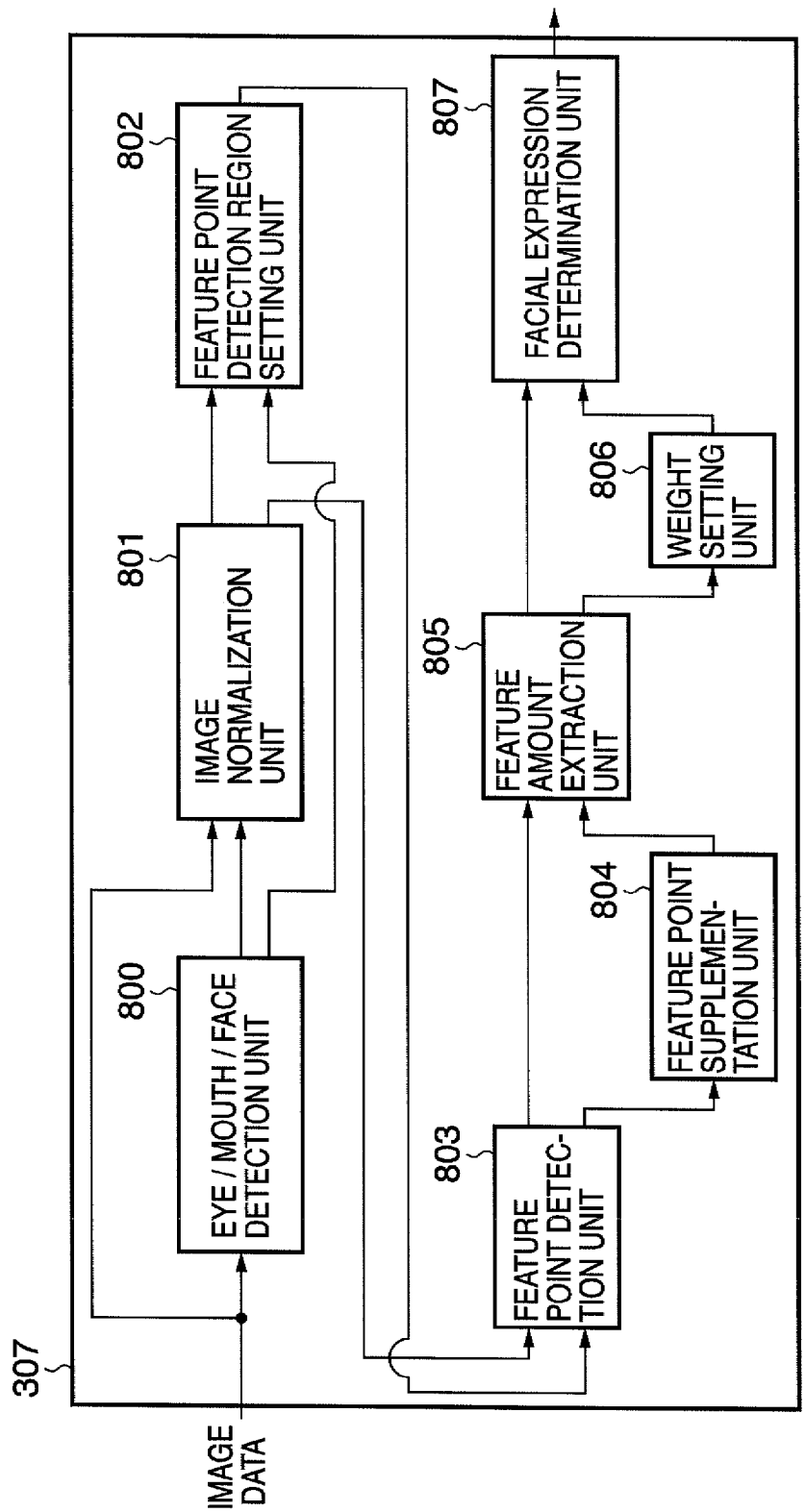
FIG. 25 is a block diagram showing the functional arrangement associated with facial expression recognition processing executed by a digital signal processor according to the third embodiment.

FIG. 25 is a block diagram showing the functional arrangement associated with the facial expression recognition processing to be executed by the digital signal processor 307 according to the third embodiment.

An eye/mouth/face detection unit 800 shown in FIG. 25 detects the face, eye, and mouth positions of a specific object in an image based on image data by applying predetermined processing to the image data (digital signal) output from the A/D converter 105.

An image normalization unit 801 executes normalization processing of a face image size and rotation direction (orientation) in face image data in the image data based on the information of the eye, mouth, and face positions detected by the eye/mouth/face detection unit 800.

A feature point detection region setting unit 802 sets predetermined feature point detection regions using the face image data normalized by the image normalization unit 801 and the information of the face, eye, and mouth positions detected by the eye/mouth/face detection unit 800.

A feature point detection unit 803 detects predetermined feature points from the face image data normalized by the image normalization unit 801 and the setting regions set by the feature point detection region setting unit 802.

A feature point supplementation unit 804 supplements feature points when there are some feature points which are not detected by the feature point detection unit 803.

A feature amount extraction unit 805 extracts predetermined feature amounts used for facial expression recognition from the predetermined feature points detected by the feature point detection unit 803 and those supplemented by the feature point supplementation unit 804.

A weight setting unit 806 sets weights for the feature amounts extracted by the feature amount extraction unit 805.

A facial expression determination unit 807 determines a facial expression using the predetermined feature amounts extracted by the feature amount extraction unit 805 and the weights set by the weight setting unit 806.

The respective units shown in FIG. 25 will be described in detail below.

Since the eye/mouth/face detection unit 800, image normalization unit 801, feature point detection region setting unit 802, and feature point detection unit 803 execute the same processes as those with the same names shown in FIG. 3, a detailed description thereof will not be given.

The feature point supplementation unit 804 will be described in detail below.

Figure 26:
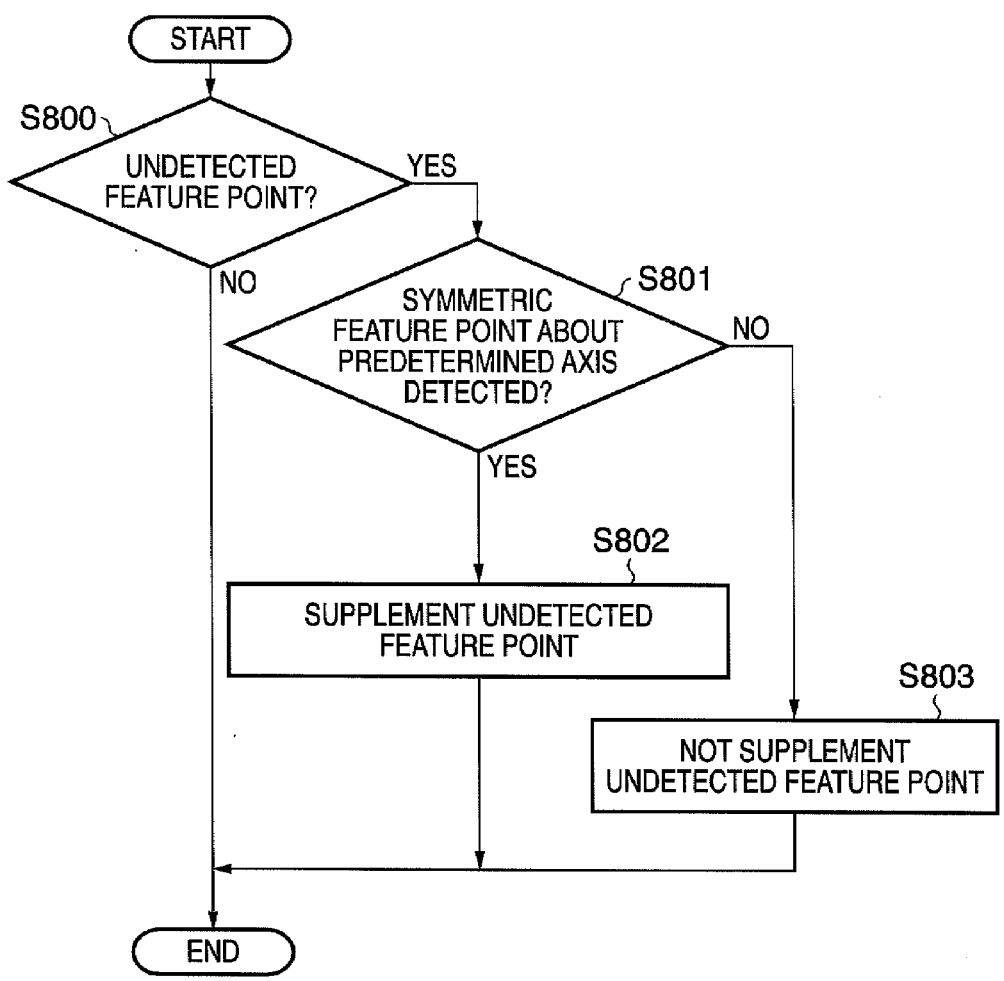
FIG. 26 is a flowchart showing undetected feature point supplementation processing by a feature point supplementation unit.
Figure 27:
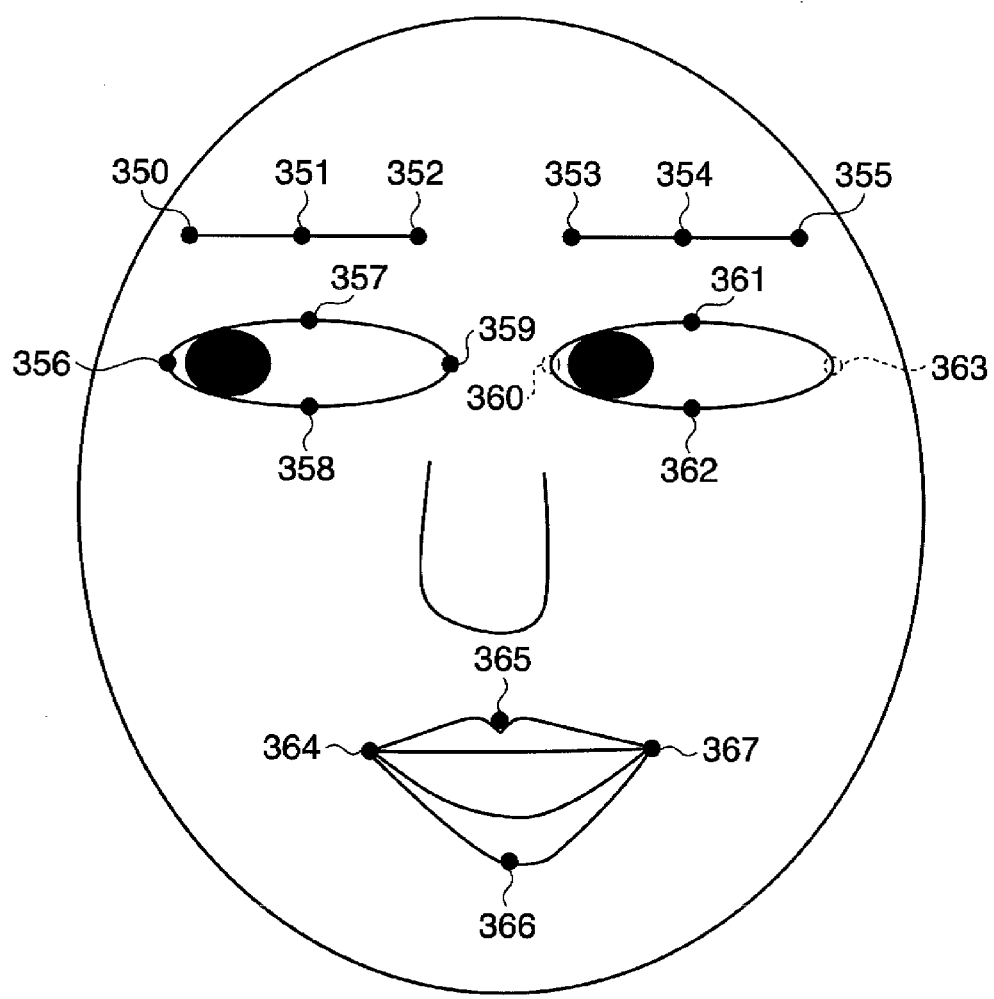
FIG. 27 is a view showing face image data when some feature points are not detected by a feature point detection unit.
Figure 28:
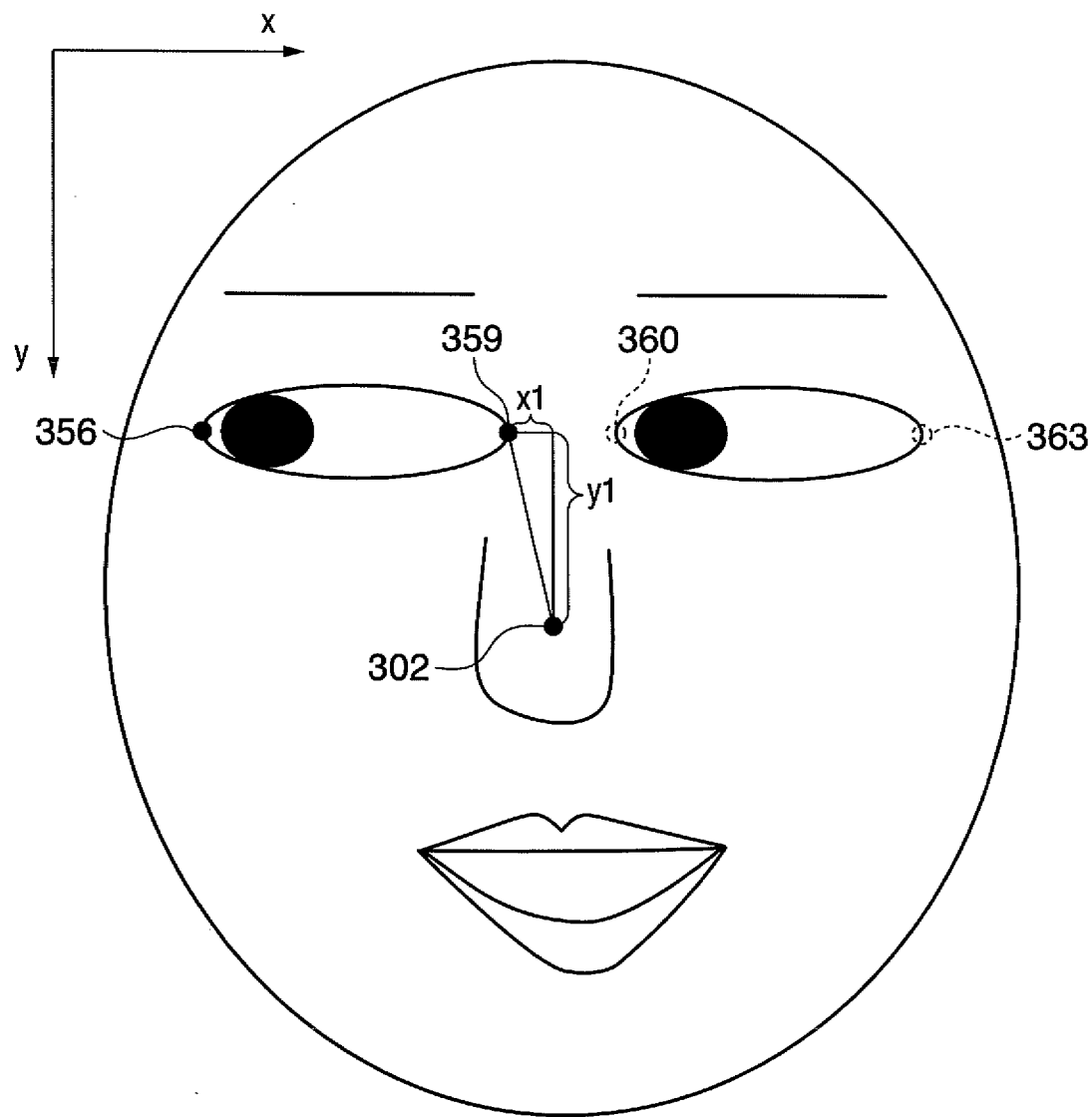
FIG. 28 is a view showing a method of supplementing undetected feature points shown in FIG. 27.

FIG. 26 is a flowchart showing undetected feature point supplementation processing by the feature point supplementation unit 804. FIG. 27 shows face image data when the feature point detection unit 803 cannot detect some feature points 360 and 363. FIG. 28 is a view showing the method of supplementing the undetected feature points shown in FIG. 27.

The feature point supplementation unit 804 checks in step S800 in FIG. 26 if there are undetected feature points upon detection of feature points by the feature point detection unit 803. As a result of checking, if there is no undetected feature point, the processing of the flowchart shown in FIG. 26 ends.

On the other hand, as a result of checking in step S800, if there are undetected feature points like the feature points 360 and 363 shown in FIG. 27, the process advances to step S801. The feature point supplementation unit 804 checks in step S801 if a feature point located at a position symmetric to the undetected feature point about a predetermined axis (specific axis) is detected. That is, if the undetected feature point is the feature point 360, the unit 804 checks whether or not the feature point 359, which is symmetric to the feature point 360 about a straight line passing through the center of the face region, i.e., the face position 302 shown in FIG. 28 as a central axis (predetermined axis), is detected.

As a result of checking in step S801, if the feature point located at a position symmetric to the undetected feature point about the predetermined axis is detected, the feature point supplementation unit 804 executes supplementation processing of that undetected feature point in step S802.

In step S802, the feature point supplementation unit 804 calculates relative coordinates (x1, y1) to the detected feature point 359 with reference to the face position 302, as shown in, e.g., FIG. 28. The unit 804 then calculates coordinates (x+x1, y−y1) using the face position 302 (x, y) and the relative coordinates (x1, y1), and sets the coordinates as a coordinate value of the feature point 360. As for the undetected feature point 363, the unit 804 executes the same processing as that for the feature point 360 to calculate a coordinate value of the feature point 363. In this manner, for feature points having nearly no variations, the supplementation processing is executed using the detected feature points.

On the other hand, as a result of checking in step S801, if a feature point at a position symmetric to the undetected feature point about the predetermined axis is not detected, the feature point supplementation unit 804 skips the supplementation processing of the undetected feature point in step S803.

The feature amount extraction unit 805 extracts feature amounts associated with the image data which is to undergo recognition processing, as in the feature amount extraction unit 154 of the first embodiment. After that, the unit 805 calculates differences or ratios between the feature amounts associated with the image data which is to undergo recognition processing, and those obtained from expressionless face image data which is prepared in advance, thus calculating variations of the feature amounts of the image data which is to undergo recognition processing.

The weight setting unit 806 weights the feature amounts of each facial expression using the weighting LUT1 shown in, e.g., FIG. 16A or 16B as in the weight setting unit 155 of the first embodiment.

The facial expression determination unit 807 calculates total scores in association with respective facial expressions and determines a facial expression with a highest score as that of a person of the image data which is to undergo recognition processing, as in the facial expression determination unit 156 of the first embodiment.

According to the image sensing device of the third embodiment, when there are undetected feature points, the weighting processing is executed after the undetected feature points are supplemented, and a facial expression of a person in the image data can undergo the recognition processing with high precision.

Note that the third embodiment has explained the case in which the digital still camera is applied as an example of the image sensing device 100 as in the first embodiment. For example, a video camera or the like may be applied. Also, a predetermined program may be executed by a computer to search moving image data or still image data in a database for face image data of a predetermined facial expression.

(Fourth Embodiment)

The fourth embodiment of the present invention will be described in detail hereinafter with reference to the accompanying drawings.

The arrangement of an image sensing device (image processing apparatus) according to the fourth embodiment is the same as that of the image sensing device according to the first embodiment shown in FIG. 1, except for the internal arrangement of the digital signal processor 107. That is, this embodiment adopts a digital signal processor 407 shown in FIG. 30 in place of the digital signal processor 107 according to the first embodiment shown in FIG. 1.

More specifically, the digital signal processor in the first embodiment (also in the second and third embodiments) executes facial expression recognition processing. However, the digital signal processor 407 of the fourth embodiment executes personal verification processing to be described later. The control operation of the image sensing device (image processing apparatus) according to the fourth embodiment is the same as that of the image sensing device according to the first embodiment shown in FIG. 2, except that the steps S212 and 213 shown in FIG. 2 are replaced by the processes in steps S901 and S902 shown in FIG. 29.

Figure 29:
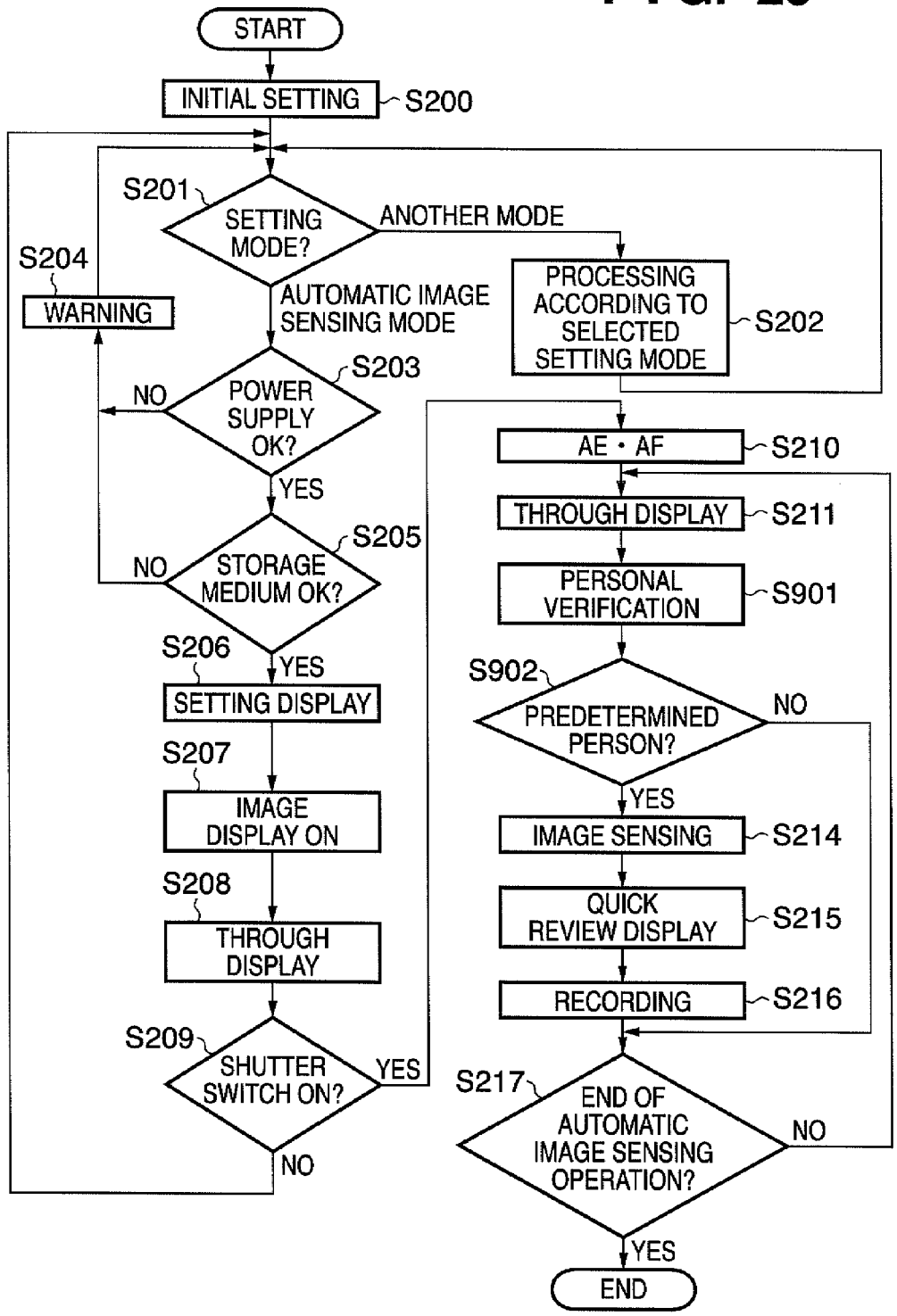
FIG. 29 is a flowchart showing the control operation of an image sensing device (image processing apparatus) according to the fourth embodiment.

FIG. 29 is a flowchart showing the control operation of the image sensing device (image processing apparatus) 100 according to the fourth embodiment. Note that a program required to implement the processing shown in FIG. 29 is stored in the internal memory in the system controller 112, and is executed under the control of the system controller 112.

After the system controller 112 executes the processes in steps S200 to S211 shown in FIG. 2, it controls the digital signal processor 407 to execute personal verification processing using the sensed image data in step S901.

The system controller 112 checks in step S902 if the person determined as a result of the personal verification processing in step S901 is a predetermined person who is set in advance. As a result of checking, if the person determined as a result of the personal verification processing in step S901 is a predetermined person who is set in advance, the controller 112 executes the processes in steps S214 to S217 shown in FIG. 2 and then ends the processing of this flowchart.

On the other hand, as a result of checking in step S902, if the person determined as a result of the personal verification processing in step S901 is not a predetermined person who is set in advance, the process advances to step S217. If it is determined in step S217 that the automatic image sensing operation is to end, the processing of this flowchart ends.

Figure 30:
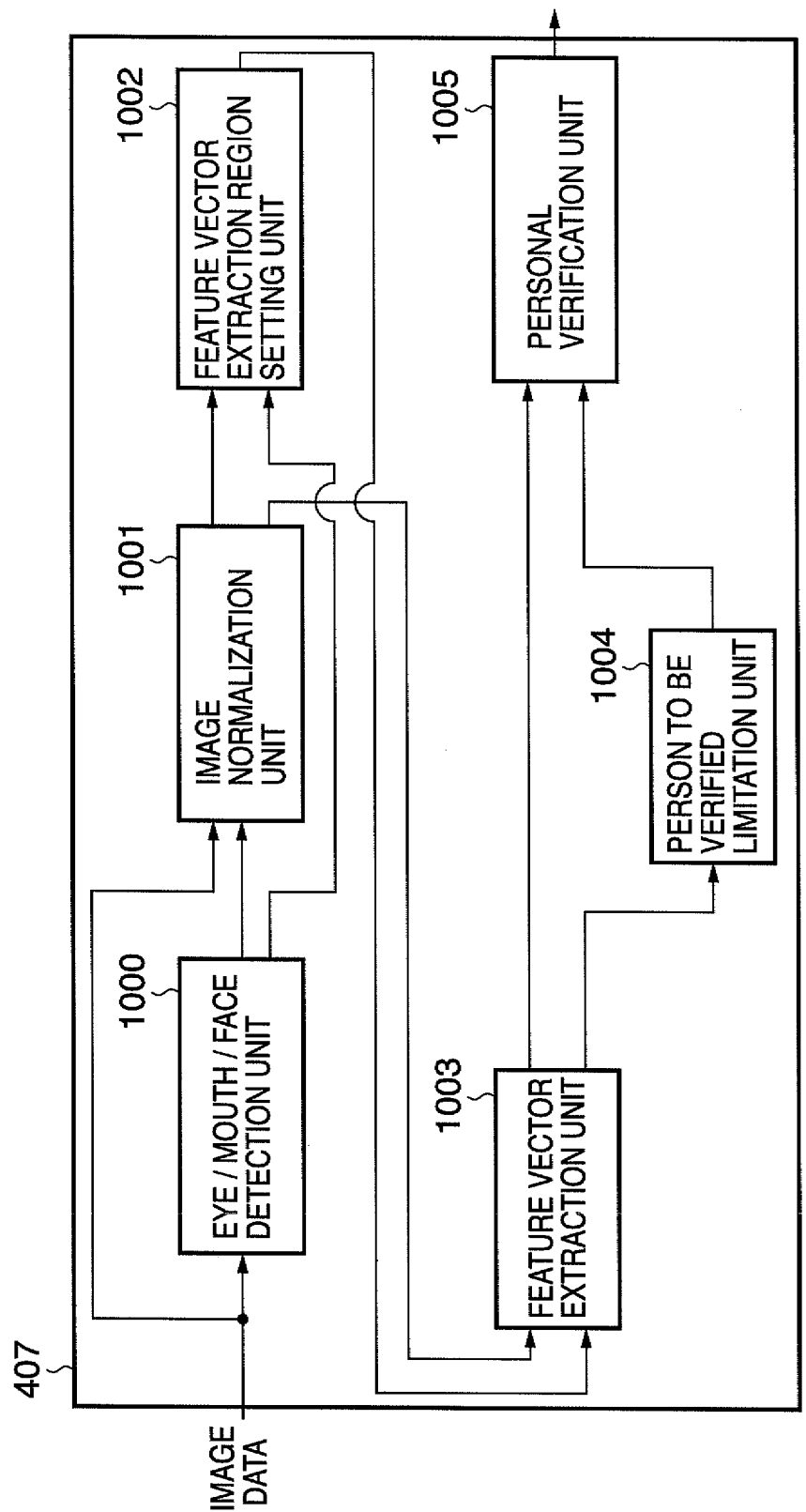
FIG. 30 is a block diagram showing the functional arrangement associated with personal verification processing executed by a digital signal processor according to the fourth embodiment.

FIG. 30 is a block diagram showing the functional arrangement associated with the personal verification processing to be executed by the digital signal processor 407 of the fourth embodiment.

An eye/mouth/face detection unit 1000 shown in FIG. 30 detects the face, eye, and mouth positions of a specific object in an image based on image data by applying predetermined processing to the image data (digital signal) output from the A/D converter 105.

An image normalization unit 1001 executes normalization processing of a face image size and rotation direction (orientation) in face image data in the image data based on the information of the eye, mouth, and face positions detected by the eye/mouth/face detection unit 1000.

A feature vector extraction region setting unit 1002 sets respective extraction regions used to extract feature vectors using the information of the eye, mouth, and face positions detected by the eye/mouth/face detection unit 1000, and the image data normalized by the image normalization unit 1001.

A feature vector extraction unit 1003 extracts feature vectors using the extraction regions set by the feature vector extraction region setting unit 1002 and the image data normalized by the image normalization unit 1001.

A person to be verified limitation unit 1004 limits a range of persons to be verified based on the extraction results of the feature vectors by the feature vector extraction unit 1003.

A person verification unit 1005 applies personal verification processing to the persons to be verified limited by the person to be verified limitation unit 1004 using the feature vectors extracted by the feature vector extraction unit 1003.

The respective units shown in FIG. 30 will be described in detail below.

Since the eye/mouth/face detection unit 1000, image normalization unit 1001, feature vector extraction region setting unit 1002, and feature vector extraction unit 1003 execute the same processes as those with the same names shown in FIG. 20, a detailed description thereof will not be given.

The person to be verified limitation unit 1004 will be described in detail below.

FIG. 31 is a flowchart showing the limitation processing of persons to be verified by the person to be verified limitation unit 1004.

The person to be verified limitation unit 1004 checks in step S1000 if the feature vector extraction unit 1003 extracts all feature vectors. As a result of checking, if the feature vector extraction unit 1003 extracts all the feature vectors, the unit 1004 selects all persons stored in a database as persons to be verified in step S1001.

On the other hand, as a result of checking in step S1000, if the feature vector extraction unit 1003 extracts not all feature vectors (it does not extract some feature vectors), the person to be verified limitation unit 1004 checks in step S1002 if the number of unextracted feature vectors is equal to or smaller than a predetermined value.

As a result of checking in step S1002, if the number of unextracted feature vectors is equal to or smaller than a predetermined value, the person to be verified limitation unit 1004 executes limitation processing of persons to be verified in step S1003. That is, for example, when a feature vector cannot be extracted from extraction region A set by the feature vector extraction region setting unit 1002, the unit 1004 selects only persons who have features effective to undergo personal verification in extraction regions other than extraction region A from a database prepared in advance. A practical example of this case will be described below with reference to FIG. 32.

Figure 32:
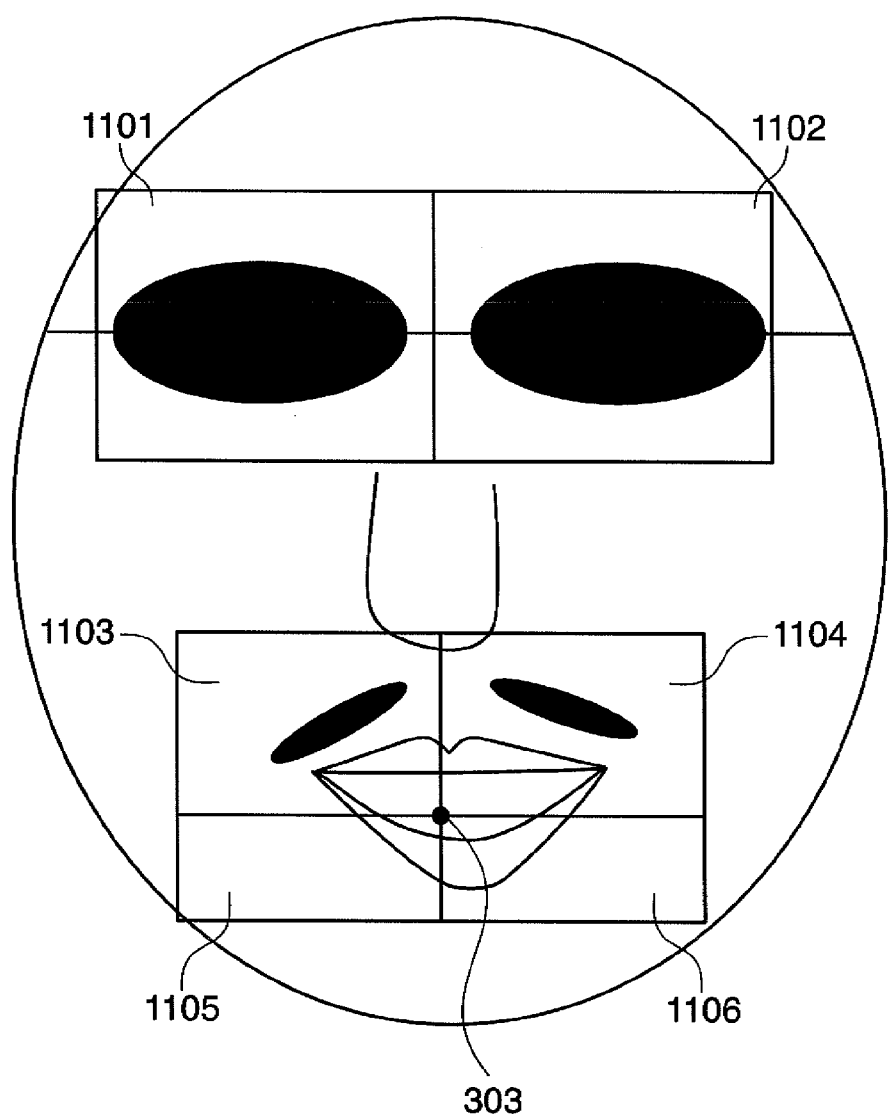
FIG. 32 is a view showing face image data of a person who wears sunglasses and has mustaches near a mouth.

FIG. 32 shows face image data of a person who wears sunglasses and has mustaches near a mouth. Note that extraction regions 1101 to 1106 are those which are set by the feature vector extraction region setting unit 1002 and are used to extract feature vectors. FIG. 33 shows registered persons who are registered in a database, and keywords corresponding to these persons.

When feature vectors associated with eye regions cannot be extracted from the extraction regions 1101 and 1102 shown in FIG. 32, the person to be verified limitation unit 1004 limits to persons who have, near mouths, features effective to undergo personal verification in the database prepared in advance, e.g., to persons who have mustaches near mouths, as shown in FIG. 32, and the like. In order to select only persons who have mustaches near mouths from the database, a keyword "mustache" shown in FIG. 33 is registered in combination upon registering persons. In this way, only persons who have mustaches near mouths can be easily selected from the database.

In this manner, the limitation processing of persons to be verified in step S1003 shown in FIG. 31 is executed.

On the other hand, as a result of checking in step S1002 in FIG. 31, if the number of unextracted feature vectors is larger than a predetermined value, the person to be verified limitation unit 1004 skips the personal verification processing in step S1004.

The personal verification unit 1005 will be described in detail below.

The personal verification unit 1005 calculates feature vectors from identical regions of a plurality of image data prepared for a single person to be registered as in the method described in the second embodiment. The unit 1005 then calculates an average of the calculated feature vectors to obtain an average feature vector.

The personal verification unit 1005 performs principal component analysis of the average feature vectors extracted from the respective extraction regions and calculates top k eigenvectors to determine their partial spaces. The unit 1005 projects the feature vectors extracted by the feature vector extraction unit 1003 into the partial spaces and calculates similarities based on their Euclidean distances and the like. Then, the unit 1005 determines a person corresponding to registered image data with a largest total of similarities obtained from the feature vectors as a verified person in a known method. Note that the personal verification method may use methods other than that of this embodiment, and similarities may be calculated using elements other Euclidean distances.

In this way, even when predetermined feature vectors cannot be extracted, if extracted feature vectors include important information required to verify persons, only registered persons having that information as a keyword are selected and undergo verification processing, thus implementing personal verification for a specific person. As described above, even when not all feature vectors are extracted, the verification processing of limited persons to be verified can be executed by limiting the range of persons to be verified.

As another method, the verification processing may be executed not only by simply executing the limitation processing of persons to be verified based on the extraction results of feature vectors obtained from the input image data, but also after the weights for the extracted feature vectors are changed. Upon changing the weights for the feature vectors, for example, an LUT (LUT4) prepared in advance is used.

In the generation method of the LUT4 to be used in such case, when there are unextracted features, the sum of the weights may be reduced in correspondence with the number of unextracted features, and the weights may be assigned in accordance with the importance levels of extracted features other than the unextracted features, as has been explained in the first embodiment.

For example, a case will be examined below in which feature vectors cannot be extracted from the extraction regions 1101 and 1102 shown in FIG. 32. In this case, only persons who have mustaches near mouths of the registered persons undergo verification processing. However, since the extraction regions 1103 and 1104 of the extraction regions 1103 to 1106 include mustaches, features extracted from these regions are important to identify a person. Hence, the weights for the extraction regions 1103 and 1104 are set to be larger than those of the extraction regions 1105 and 1106. This weighting processing will be described below with reference to the flowchart.

Figure 34:
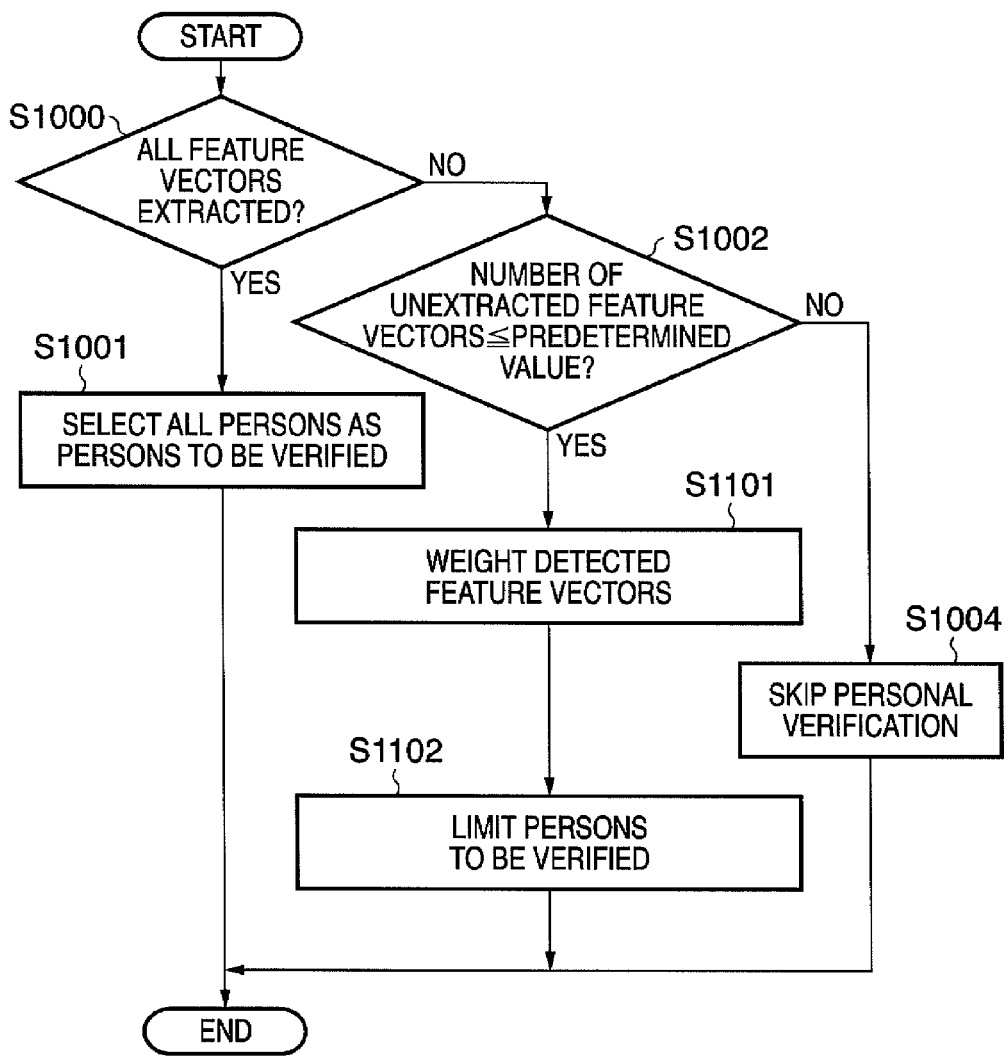
FIG. 34 is a flowchart showing processing in which the weighting processing is added to the limitation processing of persons to be verified (FIG. 31) to be executed by the person to be verified limitation unit.

FIG. 34 is a flowchart showing processing in which the weighting processing is added to the limitation processing of persons to be verified (FIG. 31) to be executed by the person to be verified limitation unit 1004. In FIG. 34, the same step numbers denote the same processing steps as those in FIG. 31.

The person to be verified limitation unit 1004 checks in step S1000 if the feature vector extraction unit 1003 extracts all feature vectors, as in FIG. 31. As a result of checking, if the feature vector extraction unit 1003 extracts all feature vectors, the unit 1004 selects all persons stored in a database as persons to be verified in step S1001.

On the other hand, as a result of checking in step S1000, if the feature vector extraction unit 1003 extracts not all feature vectors (it does not extract some feature vectors), the person to be verified limitation unit 1004 checks in step S1002 if the number of unextracted feature vectors is equal to or smaller than a predetermined value, as in FIG. 31.

As a result of checking in step S1002, if the number of unextracted feature vectors is equal to or smaller than a predetermined value, the person to be verified limitation unit 1004 weights the feature vectors detected by the feature vector extraction unit 1003 using the aforementioned LUT4 or the like in step S1101. Then, the unit 1004 executes the limitation processing of persons to be verified in step S1102.

On the other hand, as a result of checking in step S1002, if the number of unextracted feature vectors is larger than a predetermined value, the person to be verified limitation unit 1004 skips the personal verification processing in step S1004, as in FIG. 31.

Note that the similarity calculation method upon execution of the verification processing by the personal verification unit uses the method described in the second embodiment and the like.

As described above, even when predetermined feature vectors cannot be extracted, the personal verification processing can be applied to persons who have extracted feature vectors including important information required to verify them. In the image sensing device of this embodiment, when not all features can be extracted, the weights for the extracted features are changed to limit the range of persons to be verified, thus allowing the verification processing of the limited persons.

When certain feature vectors cannot be extracted, the verification processing may be executed after the weights for the extracted feature vectors are simply changed using the LUT5 for personal verification without executing the processing for limiting persons to be verified. In this case, in the generation method of the LUT5, the sum of the weights is reduced in accordance with the number of unextracted features, and these weights are assigned in correspondence with the importance levels of the extracted feature. In this case, the sum of the weights may not be reduced in accordance with the number of unextracted features.

Figure 35:
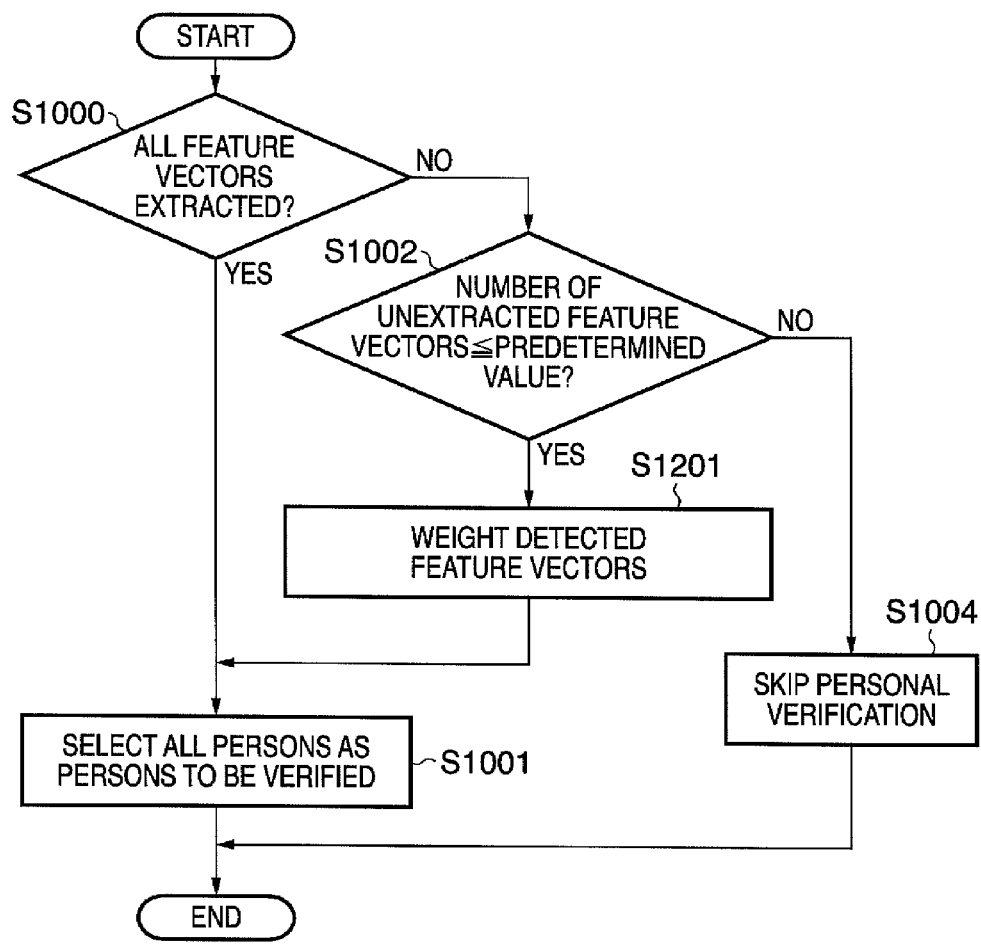
FIG. 35 is a flowchart showing the processing which performs only the weighting processing of extracted feature vectors without executing the limitation processing of persons to be verified in the processing shown in FIG. 34.

FIG. 35 is a flowchart the processing which performs only the weighting processing of extracted feature vectors without executing the limitation processing of persons to be verified in the processing shown in FIG. 34. More specifically, when certain feature vectors cannot be extracted, the weights for other extracted feature vectors are changed using the LUT5 prepared in advance, and the verification processing is applied to all the persons to be verified. The same step numbers denote the same processing steps as those in FIG. 34. A description will be given for respective steps.

The person to be verified limitation unit 1004 checks in step S1000 if the feature vector extraction unit 1003 extracts all feature vectors, as in FIG. 34 (FIG. 31). As a result of checking, if the feature vector extraction unit 1003 extracts all feature vectors, the unit 1004 selects all persons stored in a database as persons to be verified in step S1001.

On the other hand, as a result of checking in step S1000, if the feature vector extraction unit 1003 extracts not all feature vectors (it does not extract some feature vectors), the person to be verified limitation unit 1004 checks in step S1002 if the number of unextracted feature vectors is equal to or smaller than a predetermined value, as in FIG. 31.

Figure 36:
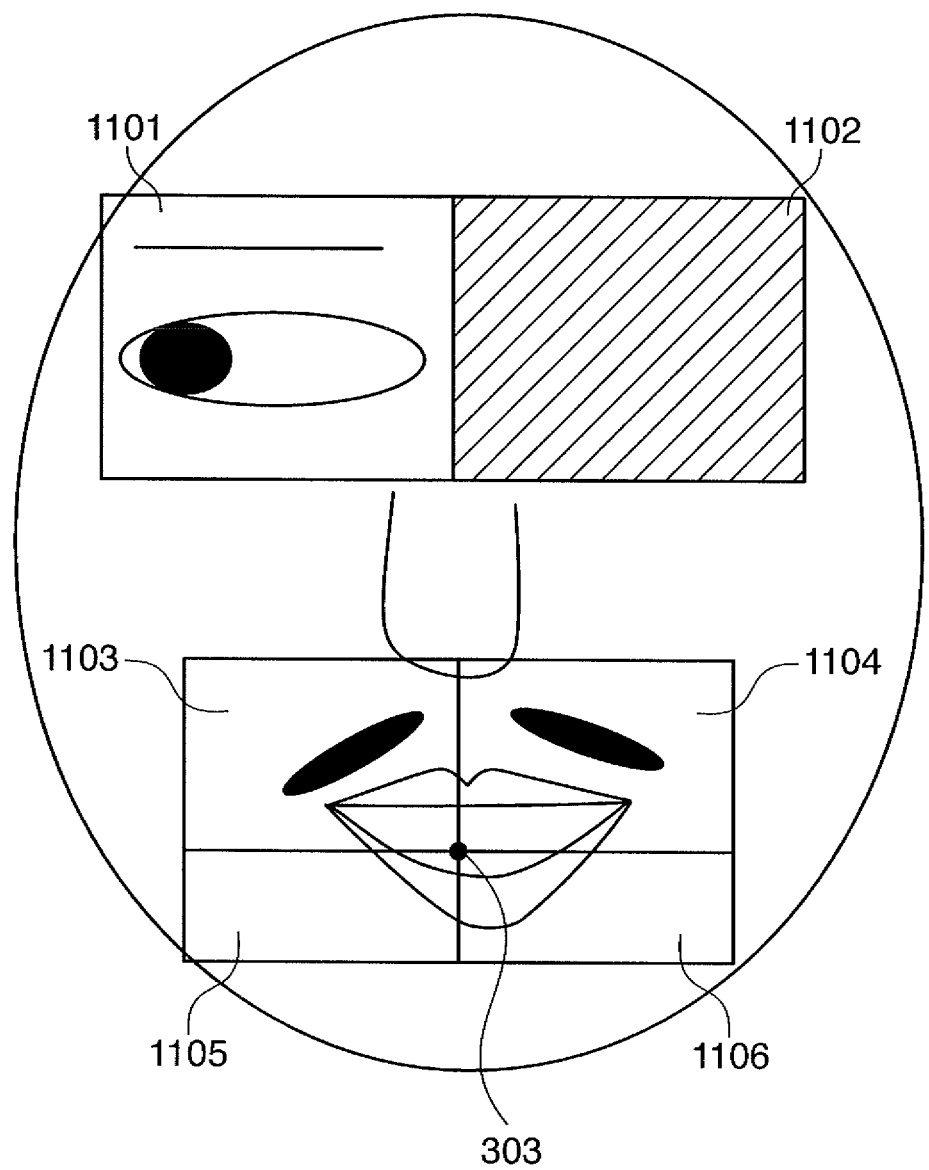
FIG. 36 is a view showing face image data of a person when an extraction region 1102 is occluded.

As a result of checking in step S1002, if the number of unextracted feature vectors is equal to or smaller than a predetermined value, the person to be verified limitation unit 1004 weights the feature vectors detected by the feature vector extraction unit 1003 using the aforementioned LUT5 or the like in step S1201. That is, when the extraction region 1102 cannot be detected (due to occlusion or the like), as shown in FIG. 36, the unit 1004 weights feature vectors extracted from the extraction regions 1101 and 1103 to 1106 using the LUT5 for personal verification. In case of FIG. 35, the process then advances to step S1001 to select all persons stored in the database as persons to be verified.

On the other hand, as a result of checking in step S1002, if the number of unextracted feature vectors is larger than a predetermined value, the person to be verified limitation unit 1004 skips the personal verification processing in step S1004, as in FIG. 31. Note that the personal verification method may be implemented using similarities, as described in the facial expression recognition processing of the second embodiment or using other methods.

According to the image sensing device of the fourth embodiment, even when not all feature vectors are extracted, the verification processing of a person in the image data can be executed with high precision by changing the weights of the extracted feature vectors.

Note that the fourth embodiment has explained the case wherein the digital still camera is applied as an example of the image sensing device 100 as in other embodiments. For example, a video camera or the like may be applied. Also, a predetermined program may be executed by a computer to search moving image data or still image data in a database for face image data of a predetermined person.

In the image sensing device (image processing apparatus) 100 according to the aforementioned embodiments, even when there are some unextracted features upon execution of recognition processing (facial expression recognition or personal verification), the extracted features are weighted again based on these features to implement the recognition processing. Or even when there are some unextracted features, the unextracted features are supplemented using the extracted features, and the recognition processing (facial expression recognition or personal verification) is then executed after weighting. With this processing, even when there are some unextracted features, the recognition processing (facial expression recognition of a person or personal verification) can be executed with high precision.

Furthermore, as for a predetermined facial expression of a person, only predetermined features or regions often change largely. For example, in case of a smile facial expression, a part near a mouth region varies largely. Also, as for verification of a specific person, specific parts or regions, which are used in verification and form a face, often become most important features required to distinguish a given person from other persons. For example, for a person who has a mustache near a mouth, features near the mouth often become those most important to distinguish him from other persons rather than other features. Hence, in the image sensing device (image processing apparatus) 100 according to the aforementioned embodiments, even when there are some unextracted features, facial expressions to be determined or persons to be verified are limited to execute the recognition processing (facial expression recognition of a person or personal verification) with high precision.

The units shown in FIGS. 1, 3, 20, 25, and 30 which configure the image sensing device (image processing apparatus) 100 according to the aforementioned embodiments, and respective steps in FIGS. 2, 14, 15, 17, 23, 24, 26, 29, 31, 34, and 35 which show the image processing methods in the image sensing device 100 can be implemented when a program stored in a ROM, RAM, or the like of a computer runs. This program and a computer-readable storage medium which records that program are incorporated in the present invention.

More specifically, the program is supplied to the computer by recording it on a storage medium such as a CD-ROM or the like or via various transmission media. As the storage medium that records the program, a flexible disk, hard disk, magnetic tape, magneto-optical disk, nonvolatile memory card, and the like can be used in addition to the CD-ROM. On the other hand, as the transmission media of the program, communication media in computer network (a LAN, WAN such as the Internet, wireless communication network, etc.) systems used to supply program information by transmitting it as carriers can be used. As the communication media in this case, a wired line such as an optical fiber and the like, wireless line, and so forth can be used.

Such program is incorporated in the present invention not only in a case wherein the functions of the image sensing device 100 according to the embodiments are implemented when the computer executes the supplied program but also a case in which the functions of the image sensing device 100 according to the embodiments are implemented by the program in collaboration with an OS (operating system), another application software, or the like, or a case in which the functions of the image sensing device 100 according to the embodiments are implemented when all or some of processes of the supplied program are executed by a function expansion board or unit of the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-020137 filed Jan. 30, 2007, which is hereby incorporated by reference herein in its entirety.

What is claimed is:

1. An image processing apparatus comprising:
   a feature extraction unit adapted to extract a plurality of predetermined features in an object from input image data;
   a determination unit adapted to determine whether all of the plurality of predetermined features have been extracted;
   a first weight setting unit adapted to set weights preset in advance for the plurality of predetermined features when it is determined that all of the plurality of predetermined features have been extracted;
   a second weight setting unit adapted to set respective weights for the features extracted by said feature extraction unit when it is determined that there are features which have not been extracted by said feature extraction unit, wherein the respective weights for the extracted features are determined in accordance with which features have not been extracted from among the plurality of predetermined features; and
   a recognition processing unit adapted to execute recognition processing of the object based on the features weighted by said first or second weight setting unit,
   wherein a processor is included in said apparatus.

2. The apparatus according to claim 1, wherein the object is a person, and said apparatus further comprises a face detection unit adapted to detect a face of the object from the image data,
   wherein said feature extraction unit extracts, from the image data, a plurality of predetermined features on the face of the object detected by said face detection unit.

3. The apparatus according to claim 2, further comprising a normalization unit adapted to normalize a size and direction of the face of the object detected by said face detection unit,
   wherein said feature extraction unit extracts, from the image data, a plurality of predetermined features on the face of the object normalized by said normalization unit.

4. The apparatus according to claim 1, further comprising a region setting unit adapted to set, for the image data, regions associated with the plurality of features to be extracted by said feature extraction unit,
   wherein said feature extraction unit extracts the plurality of features from the regions set by said region setting unit.

5. The apparatus according to claim 1, wherein said feature extraction unit calculates variations associated with the features as the features on the object.

6. The apparatus according to claim 1, wherein the object is a person, and said recognition processing unit executes as the recognition processing one of recognition processing of a facial expression of the object and personal verification of the object.

7. The apparatus according to claim 1, further comprising a storage unit adapted to store the image data based on a result of the recognition processing by said recognition processing unit.

8. An image processing method performed by a processor, the method comprising:
   a feature extraction step of extracting a plurality of predetermined features in an object from input image data;
   a determination step of determining whether all of the plurality of predetermined features have been extracted;
   a first weight setting step of setting weights preset in advance for the plurality of predetermined features when it is determined that all of the plurality of predetermined features have been extracted;
   a second weight setting step of setting respective weights for the features extracted in the feature extraction step when it is determined that there are features which have not been extracted in the feature extraction step, wherein the respective weights for the extracted features are determined in accordance with which features have not been extracted from among the plurality of predetermined features; and
   a recognition processing step of executing recognition processing of the object based on the features weighted in the first or second weight setting step.

9. A program stored in a non-transitory computer-readable storage medium for making a computer execute a method comprising:
   a feature extraction step of extracting a plurality of predetermined features in an object from input image data;
   a determination step of determining whether all of the plurality of predetermined features have been extracted;
   a first weight setting step of setting weights preset in advance for the plurality of predetermined features when it is determined that all of the plurality of predetermined features have been extracted;
   a second weight setting step of setting respective weights for the features extracted in the feature extraction step when it is determined that there are features which have not been extracted in the feature extraction step, wherein the respective weights for the extracted features are determined in accordance with which features have not been extracted from among the plurality of predetermined features; and
   a recognition processing step of executing recognition processing of the object based on the features weighted in the first or second weight setting step.

* * * * *